US012282979B2

(12) United States Patent
Filler et al.

(10) Patent No.: US 12,282,979 B2
(45) Date of Patent: Apr. 22, 2025

(54) SERIALIZED DIGITAL WATERMARKING FOR VARIABLE DATA PRINTING

(71) Applicant: Digimarc Corporation, Beaverton, OR (US)

(72) Inventors: Tomas Filler, Beaverton, OR (US); Matthew M. Weaver, Portland, OR (US); Tony F. Rodriguez, Portland, OR (US); Donald Haaga, Portland, OR (US); Mark-Andrew Ray Tait, Beaverton, OR (US); Jeremy Cattone, Tigard, OR (US)

(73) Assignee: Digimarc Corporation, Beaverton, OR (US)

( * ) Notice: Subject to any disclaimer, the term of this patent is extended or adjusted under 35 U.S.C. 154(b) by 256 days.

(21) Appl. No.: 17/716,416

(22) Filed: Apr. 8, 2022

(65) Prior Publication Data

US 2022/0301094 A1 Sep. 22, 2022

Related U.S. Application Data

(63) Continuation-in-part of application No. 16/789,992, filed on Feb. 13, 2020, now Pat. No. 11,386,517, (Continued)

(51) Int. Cl.
*G06K 9/00* (2022.01)
*G06F 3/12* (2006.01)
(Continued)

(52) U.S. Cl.
CPC ............ *G06T 1/0092* (2013.01); *G06F 3/122* (2013.01); *G06F 3/1243* (2013.01);
(Continued)

(58) Field of Classification Search
CPC ............ G06K 9/00; G06K 19/06; H04N 1/40
(Continued)

(56) References Cited

U.S. PATENT DOCUMENTS 6,614,914 B1   9/2003   Rhoads
7,352,878 B2   4/2008   Reed
(Continued)

OTHER PUBLICATIONS

Anh Thu Phan Ho, Bao An Hoang Mai, Wadih Sawaya, Patrick Bas. Document Authentication Using Graphical Codes: Reliable Performance Analysis and Channel Optimization. EURASIP Journal on Information Security, Hindawi, 2014, pp. 10.1186/1687-417X-2014-9.

(Continued)

*Primary Examiner* — Seyed H Azarian
(74) *Attorney, Agent, or Firm* — Digimarc Corporation

(57) ABSTRACT

Variable data printing workflows are enhanced for use with content that includes 2D code patterns, such as digital watermark data. One arrangement includes applying a filter to a content stream within a PDF document to extract both first variable pattern data for a first watermark pattern and second variable pattern data for a second watermark pattern. A first composite watermark pattern is then defined based on the extracted first variable watermark pattern data in conjunction with static watermark pattern data, and a second composite watermark pattern is defined based on the extracted second variable watermark pattern data in conjunction with the static watermark pattern data. A variety of other features and arrangements are also detailed.

15 Claims, 22 Drawing Sheets

Related U.S. Application Data which is a continuation of application No. 16/356,806, filed on Mar. 18, 2019, now Pat. No. 10,565,669, which is a continuation of application No. 15/928,628, filed on Mar. 22, 2018, now Pat. No. 10,235,731, which is a continuation of application No. 15/167,932, filed on May 27, 2016, now Pat. No. 9,928,561.

(60) Provisional application No. 63/323,833, filed on Mar. 25, 2022, provisional application No. 62/168,694, filed on May 29, 2015.

(51) Int. Cl.
  *G06K 19/06*   (2006.01)
  *G06T 1/00*   (2006.01)
  *H04N 1/32*   (2006.01)

(52) U.S. Cl.
  CPC .......... *G06F 3/1282* (2013.01); *G06T 1/0028* (2013.01); *G06T 1/005* (2013.01); *H04N 1/32* (2013.01); *H04N 1/32256* (2013.01); *G06T 2201/0051* (2013.01); *G06T 2201/0061* (2013.01); *G06T 2201/0202* (2013.01); *G06T 2201/0601* (2013.01)

(58) Field of Classification Search
  USPC ........ 382/100, 103, 112, 155, 162, 170–173, 382/181, 232, 243, 235, 254, 274, 276, 382/285, 305; 713/176; 358/1.14, 1.15, 358/3.28
  See application file for complete search history.

(56) References Cited

U.S. PATENT DOCUMENTS

| | | | |
|---|---|---|---|
| 8,300,884 B2 * | 10/2012 | Sharma | G10L 19/018 |
| | | | 713/176 |
| 8,355,525 B2 | 1/2013 | McKinley | |
| 8,594,364 B2 | 11/2013 | Hein | |
| 9,380,186 B2 * | 6/2016 | Reed | H04N 1/6013 |
| 9,401,001 B2 | 7/2016 | Reed | |
| 9,449,357 B1 | 9/2016 | Lyons | |
| 9,565,335 B2 | 2/2017 | Reed | |
| 9,635,378 B2 | 4/2017 | Holub | |
| 9,747,656 B2 | 8/2017 | Stach | |
| 9,928,561 B2 | 3/2018 | Filler | |
| 10,235,731 B2 | 3/2019 | Filler | |
| 10,565,669 B2 | 2/2020 | Filler | |
| 10,580,103 B1 | 3/2020 | Falkenstern | |
| 11,062,108 B2 | 7/2021 | Bradley | |
| 11,288,764 B2 | 3/2022 | Kamath | |
| 11,386,517 B2 | 7/2022 | Filler | |
| 11,636,565 B1 | 4/2023 | Evans | |
| 11,900,497 B1 | 2/2024 | Falkenstern | |
| 2002/0099943 A1 | 7/2002 | Rodriguez | |
| 2002/0118394 A1 | 8/2002 | McKinley | |
| 2003/0033530 A1 * | 2/2003 | Sharma | G06V 30/40 |
| | | | 713/176 |
| 2003/0112974 A1 | 6/2003 | Levy | |
| 2004/0263911 A1 * | 12/2004 | Rodriguez | H04N 1/32219 |
| | | | 358/1.14 |
| 2006/0115110 A1 | 6/2006 | Rodriguez | |
| 2007/0187505 A1 | 8/2007 | Rhoads | |
| 2007/0253027 A1 | 11/2007 | Hiebert | |
| 2008/0219503 A1 | 9/2008 | Di Venuto | |
| 2008/0301767 A1 | 12/2008 | Picard | |
| 2010/0150434 A1 * | 6/2010 | Reed | G06T 1/0028 |
| | | | 382/162 |
| 2011/0280480 A1 * | 11/2011 | Simske | G06T 1/0028 |
| | | | 382/173 |
| 2012/0127513 A1 * | 5/2012 | Gloukhenki | G06F 3/1243 |
| | | | 358/1.15 |
| 2013/0329006 A1 | 12/2013 | Boles | |
| 2014/0119593 A1 | 5/2014 | Filler | |
| 2015/0016664 A1 | 1/2015 | Rodriguez | |
| 2015/0156369 A1 | 6/2015 | Reed | |
| 2015/0187039 A1 | 7/2015 | Reed | |
| 2017/0024840 A1 | 1/2017 | Holub | |
| 2017/0061563 A1 | 3/2017 | Falkenstern | |
| 2017/0132465 A1 | 5/2017 | Kutter | |
| 2019/0332840 A1 | 10/2019 | Sharma | |
| 2021/0390358 A1 | 12/2021 | Filler | |

OTHER PUBLICATIONS

Voloshynovskiy, S.; Diephuis, M.; Beekhof, F.; Koval, O.; Keel, B., "Towards reproducible results in authentication based on physical non-cloneable functions: The forensic authentication microstructure optical set (FAMOS)," 2012 IEEE International Workshop on Information Forensics and Security (WIFS), pp. 43-48, Dec. 2-5, 2012.

\* cited by examiner

FIG. 10

| 1 | 1 | 2 |  | 3 |  |
|---|---|---|---|---|---|
| 1 | 1 |  |  |  |  |
| 1 | 1 |  | 2 |  | 3 |
| 4 |  | 5 |  | 6 |  |
|   |   |   |   |   |   |
|   |   |   |   |   |   |
| 7 |   |   |   | 9 |   |
|   |   |   |   |   |   |
|   |   |   |   |   |   |
| 10 |  |   |   |   |   |
|   |   |   |   |   |   |
|   |   |   |   |   |   |
|   |   |   |   | 15 |   |
|   |   |   |   |   |   |
|   |   |   |   |   |   |
| 16 |  | 17 |  |   |   |
|   |   |   |   |   |   |

SERIALIZED DIGITAL WATERMARKING FOR VARIABLE DATA PRINTING

RELATED APPLICATION DATA

This application claims priority to U.S. Provisional Application 63/323,833, filed Mar. 25, 2022. This application is also a continuation-in-part of U.S. application Ser. No. 16/789,992, filed Feb. 13, 2020 (U.S. Pat. No. 11,386,517), which is a continuation of U.S. application Ser. No. 16/356,806, filed Mar. 18, 2019 (now U.S. Pat. No. 10,565,669), which is a continuation of U.S. application Ser. No. 15/928,628, filed Mar. 22, 2018 (now U.S. Pat. No. 10,235,731), which is a continuation of U.S. application Ser. No. 15/167,932, filed May 27, 2016 (now U.S. Pat. No. 9,928,561), which claims priority to U.S. Provisional Application 62/168,694, filed May 29, 2015. The disclosures of the just-referenced applications are hereby incorporated by reference.

TECHNICAL FIELD

The invention relates to variable data printing of machine readable information, and decoding of this information from printed objects.

BACKGROUND AND SUMMARY

Variable data printing (VDP) is a form of printing in which elements such as text, graphics and images may be changed from one printed piece to the next, without stopping or slowing down the printing process using information from a database or external file.

In one method, a static document is loaded into printer memory. The printer is instructed, through the print driver or Raster Image Processor (RIP), to always print the static document when sending any page out to the printer driver or RIP. Variable data can then be printed on top of the static document.

A second method is to combine the static and variable elements into print files, prior to printing, using standard software. This produces a conventional (and potentially huge) print file with every image being merged into every page. A shortcoming of this method is that running many very large print files can overwhelm the RIP's processing capability. When this happens, printing speeds might become slow enough to be impractical for a print job of more than a few hundred printed pieces.

A third method is to combine the static and variable elements into print files, prior to printing, using specialized VDP software. This produces print files, such as Portable Document Format (PDF) (see, in particular, PDF/VT of ISO 16612-2:2010), PostScript or Personalized Print Markup Language (PPML), that offer the potential to improve print speed since the RIP need only process static elements once. There are a variety of optimized print output formats currently in use for VDP, including optimized PDF, PPML, Fiery FreeForm, Creo Variable Print Specification (VPS), Optimized PostScript, Xerox Variable Data Intelligent PostScript Printware (VIPP), Swift Native Accelerated Personalization (SNAP), PPML/VDX, Advanced Function Printing/Intelligent Printer Data Stream (AFP/IPDS), and JLYT.

To illustrate the challenge, consider the case of an HP Indigo Digital Press from HP, Inc. The press prints each color separation at a resolution of 812 Dots Per Inch (DPI) (320 Dots Per Centimeter), which translates to around 640 K of image data per square inch. Now, for a print speed in which the printed output sheet moves at around 30 meters per minute, one can appreciate that there is potentially a tremendous amount of data that needs to be communicated to and updated in memory of the press for variable components in a limited timeframe.

For a variety of applications, it is useful to encode a unique machine readable serial number into each printed piece (or small lot of pieces). One way to accomplish this is to encode a barcode localized to one area on the printed piece. This limits the variable component of each printed piece to that area, which is dedicated to contain only the barcode. With the printing of each piece, a new barcode is generated and applied to the piece, using one of the methodologies summarized above. These localized barcodes, however, suffer from the drawback that they are only readable from one location, which makes them more difficult and slower to read. Often, the barcode is obscured and needs to be moved or imaged from many different perspectives to read it. Repeating the barcodes on several distinct locations may ameliorate this drawback somewhat, but it detracts from the aesthetics of the printed object and interferes with other information printed on it.

Advanced digital signaling schemes, such as digital watermarking and variants thereof, enable machine readable information to be woven across the entire surface of each printed piece, while coexisting other visual elements. Digital watermarking may be used to serialize objects, as described in U.S. Pat. Nos. 8,594,364, 8,355,525 and 11,288,764, which are hereby incorporated by reference. However, to be economically viable for commercial printing, new technologies are needed for VDP workflows. Digital watermark signaling has the advantage of weaving digital information robustly and imperceptibly over the entire surface of an object. Yet, this advantage presents a potential challenge in that large portions of the image may need to be changed for each printed item, slowing down the press and increasing computational complexity.

BRIEF DESCRIPTION OF THE DRAWINGS

FIG. 10 shows how multiple labels, each with a different payload, can be printed on sheets of media.

FIG. 11 shows how labels, each comprising multiple watermark blocks, can be serialized and printed on a roll medium.

FIGS. 23-25 show alternate representations by which the FIG. 22 can be expressed as series of integers.

FIGS. 28 and 30 show layered artwork arrangements including watermark patterns.

DETAILED DESCRIPTION

In the VDP environment, the printing press has the capability to update the printed image per page through the use of digital press technology. This digital press technology includes, for example, Digital Offset Color (e.g., HP Indigo Digital Offset Color), or liquid electrophotography (LEP), dry toner electrophotography (DEP), and inkjet technology-based digital printing presses.

Figure 1:
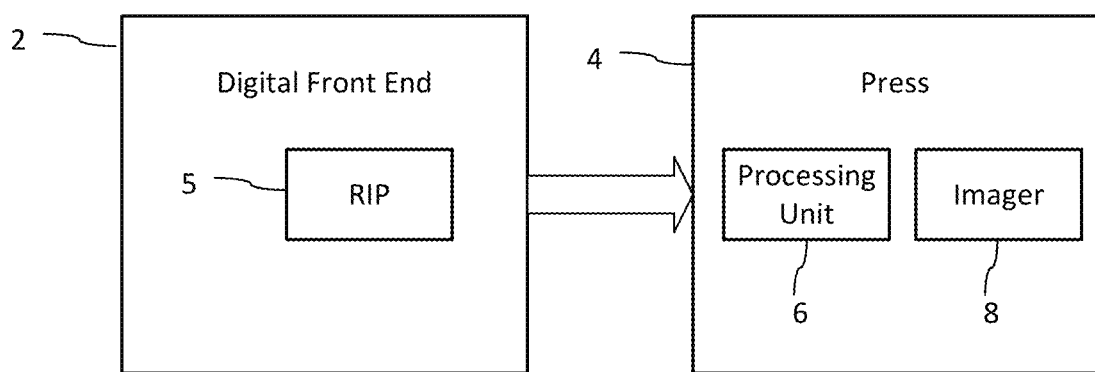
FIG. 1 is a diagram depicting a digital press system used in VDP.

FIG. 1 is a diagram of a digital press system used in VDP. The digital press system includes a Digital Front End (DFE) 2 and a press 4. The DFE prepares digital image data for printing by the press and then transmits the data to the press. In particular, the DFE includes a Raster Image Processor (RIP) 5 that converts images and print instructions specified in a page description language (PDL), like above noted print file formats, into an image format compatible for printing by the press 4. This process of converting the contents of PDL files to bitmaps is sometimes referred to as rasterizing or RIP-ing. The press 4 includes a processing unit 6, which in some of our methodologies, is used to write modified pixels into memory, where a rasterized version of a host image is stored, to create a rasterized image with a unique payload embedded in it. The imager 8 applies this rasterized image to a print medium. In digital presses, the imager creates the printed image directly from the digital data stored in memory of the press. The image output is updated per printed piece by updating the rasterized image in the memory of the press.

For the sake of illustration, we use the example of printing of packaging of a consumer packaged good ("CPG") to describe various embodiments. In this application, the "printed piece" is the printed package, and these printed pieces are printed at high speeds to use the press as efficiently as possible. To identify a CPG uniquely, each printed package is embedded with a different watermark payload. Within each piece, the watermark payload is redundantly encoded in signal blocks inserted across the printed piece, enabling the payload to be extracted from arbitrary, digitally captured image patches of about a square inch. While we refer specifically to CPG packages, our approaches apply to other printed pieces as well, including documents, labels, etc.

Figure 2:
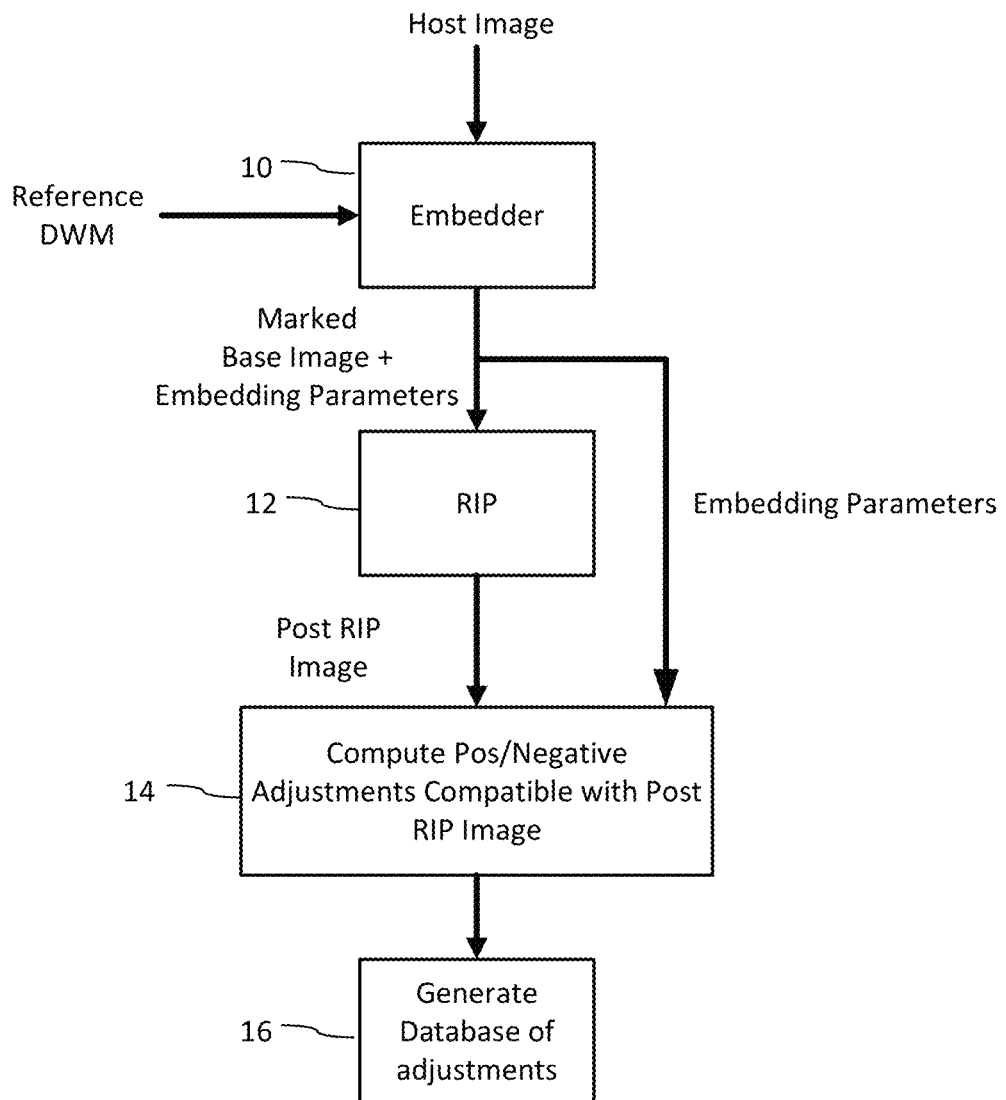
FIG. 2 is a diagram illustrating a pre-processing method to enable efficient embedding of different digital payloads across each printed piece in a VDP environment.

FIG. 2 illustrates a pre-processing method to enable efficient embedding of different watermark payloads in each printed piece in a VDP environment. An objective is to print uniquely marked pieces without degrading press speed or overwhelming the capability of the RIP in the Digital Front End (DFE) of the press to handle image modifications due to the changing watermark payload per piece. In commercial digital printing, maintaining profit margins depends on keeping the digital press working at full speed to maximize production. Due to the generation of a modified image for each printed piece, processing bottlenecks can occur at the RIP and in the communication between the RIP and the press. Processing complexity increases in the RIP when variable components of a page need to be rasterized as the press operates. Further, if substantial amounts of data (e.g., large rasterized images) need to be communicated to the press during printing, this increases complexity and cost of the data transfer, networking and memory components of the system.

The method of FIG. 2 generates image modifications for inserting variable payloads per printed piece. This method enables the modifications to be assembled efficiently in the construction of a final unique image to be printed during operation of the press, without slowing it down or requiring expensive processing capability.

The inputs are a host image and a reference digital watermark signal. For CPGs, the host image of the package design is typically provided in a design file, in a page description language file format like PDF, PostScript, or VDP variants referenced above. It typically is comprised of layers, e.g., corresponding to color separations, such as CMYK, spot colors, or other design features.

In one implementation, the embedder 10 is a software application plug-in for digital imaging software such as Adobe Photoshop or Adobe Illustrator. The embedder includes a user interface that enables the user to specify embedding parameters, such as signal strength and visibility (a visual quality constraint). The user interface further enables the user to control where the watermark signal is to be encoded, in terms of color channel and spatial area within each color channel. The embedder automates the generation of a watermark signal block (sometimes referred to as a tile). It also automates the derivation of visibility metrics based on the host image to control the visual difference caused by modification of the host image to insert the watermark signal. The embedder redundantly encodes the watermark signal blocks in a tiled fashion across the host image in both horizontal and vertical directions. For each instance of the watermark signal, the embedder adapts the watermark signal according to visibility metrics derived from the corresponding host image block, which controls the signal amplitude per color separation in which the embedder inserts the watermark signal. Implementations of these processing modules are detailed in our other patent documents, including:

Ser. No. 14/616,686, Data Hiding For Spot Colors in Product Packaging (Published as U.S. Application Publication 20150156369);

Ser. No. 14/588,636, Full-Color Visibility Model Using CSF Which Varies Spatially With Local Luminance (Published as U.S. Application Publication 20150187039);

Ser. No. 13/975,919, Geometric Enumerated Watermark Embedding for Spot Colors (Now U.S. Pat. No. 9,449,357);

62/152,745, Data Hiding Using Equal Visibility Embedding For Color Designs, and related application Ser. No. 15/137,401, entitled Full-Color Visibility Model Using CSF Which Varies Spatially With Local Luminance (Now U.S. Pat. No. 9,565,335);

Ser. No. 14/724,729, Differential Modulation For Robust Signaling And Synchronization (Now U.S. Pat. No. 9,747,656);

Ser. No. 14/725,399, Sparse Modulation For Robust Signaling And Synchronization (Now U.S. Pat. No. 9,635,378);

Ser. No. 15/072,884, Sparse Modulation For Robust Signaling And Synchronization (Published as U.S. Patent Application Publication U.S. 20170024840); and Ser. No. 16/405,621, Generating and Reading Optical Codes With Variable Density to Adapt for Visual Quality And Reliability (now U.S. Pat. No. 11,062,108).

The just-noted documents are incorporated herein by reference.

In one approach, a marked image is first created that has a uniform embedding strength across the image. This uniform strength marked image is then compared to the original image and input to a visibility model that generates a visibility map specifying a visibility measure for embedding locations within the image. The visibility measure per embedding location is converted to a mask of scale factors per embedding location.

The visibility model system uses separate Contrast Sensitivity Functions (CSFs) for contrast variations in luminance and chrominance (red-green and blue-yellow) channels. The width, characteristics or curve of the CSF in each channel is scaled or modified depending on the luminance of the local image content. For example, for a given pixel, local luminance in a neighborhood around the pixel is evaluated to determine a local brightness value. The local brightness value is used to scale or modify a CSF curve. The neighborhood may include, e.g., 4, 8 or more pixels. In some cases, the CSF is adjusted so that more blurring occurs as the luminance of the local region decreases. The error difference between the contrast of the blurred (or unblurred) original and the blurred marked image is measured using a color difference metric, e.g., $\Delta E76$, $\Delta E94$ or $\Delta E2000$. The visibility values per embedding location form the visibility map. The values are inversely related to visibility (smaller color difference means lower visibility). Thus, the values are inverted to produce scale factors that adjust the amplitude of pixel adjustments to equalize visibility of the adjustments over the marked image.

Below, we provide excerpts from a Matlab implementation showing how to derive the scale factors from the visibility map (visMap). In addition to the following operations, the implementation also addresses divide-by-zero and avoids saturation. We isolate the operations for deriving scale factors in the following to more clearly illustrate how they are obtained and applied. Here, wmC, wmM, wmY are the two dimensional vectors of adjustments to encode a watermark signal for embedding locations in each color channel. These adjustments are shaped by corresponding elements of the vector, reScale, and then added back to the unmarked image.

reScale=visMap;
    reScale=1/reScale;
    wmCshape=wmC.*reScale;
    wmMshape=wmM.*reScale;
    wmYshape=wmY.*reScale;
    img(:,:,1)=wmCshape+unmarked(:,:,1);
    img(:,:,2)=wmMshape+unmarked(:,:,2);
    img(:,:,3)=wmYshape+unmarked(:,:,3);

The mask values (reScale) use the visibility map to scale the watermark adjustment up or down based on the prediction of the visibility: low visibility area, increase the signal; high visibility area, reduce the signal. The initial watermark adjustments are computed, for example, by generating a watermark signal with uniform signal strength across the image. These adjustments are then scaled to limit them to a visibility constraint, such as a constraint where the visibility of the adjustment is equalized across the image via the above shaping according to the visibility map. Alternatively or additionally, the visibility may be limited to a threshold, such as threshold on the color difference metric, which in turn, places a limit on the amplitude of the adjustment at the embedding locations.

More information on digital watermark encoding and decoding may be found in our U.S. Patents and Applications, including U.S. Pat. Nos. 6,614,914 and 7,352,878, and U.S. Patent Publications 20100150434 and 20140119593, which are hereby incorporated by reference. U.S. Pat. No. 6,614,914 provides details on watermark signal generation, including generating watermark signal blocks with variable payload and synchronization components. It also provides watermark signal encoding and decoding schemes. U.S. application Ser. No. 14/724,729 (U.S. Pat. No. 9,747,656) details various alternative data modulation and synchronization schemes for conveying digital payloads in images. 20100150434 provides instruction on digital watermarking in chrominance channels and related schemes for reducing watermark visibility.

As detailed in this patent literature, we have developed a suite of embedder tools, implemented as application programs, application plug-ins and web services, to adapt watermark signal insertion into a variety of host image types. These tools and services are available from Digimarc Corporation of Beaverton, OR.

Some host images have variable image content in plural color separations. Embedding in these images employs visibility modeling to adapt the watermark signal based on visibility constraints and exploit information carrying capacity and hiding capacity of color channels. Some include designs printed with one or more spot colors, which pose particular challenges in terms of controlling color matching and color error due to process color modifications (in C, M, and Y) to encode the watermark. Others have areas with little host image content (e.g., blank areas or solid patches of color), and for these, embedder tools for color matching and encoding watermarked tints or encoding sparse marks are used to insert blocks of watermarked tint or sparse signal over the host image in one or more color separations. In the description of embodiments, we elaborate on use of these various alternative methods in the VDP printing press environment.

With respect to the embodiment of FIG. 2, the embedder 10 is implemented using one of our embedder tools that applies to host images with host image content that enable insertion by positive and negative modifications of pixels in at least one color separation. In this tool, the embedder 10 derives embedding parameters that control the amplitude of the watermark signal for embedding locations where elements of the watermark signal are inserted. The watermark signal block comprises an array of signal elements. This array is typically configured as a square block, e.g., 1024 by 1024, 512 by 512, 256 by 256, 128 by 128, 64 by 64, etc. of embedding locations at a particular watermark signal resolution, e.g., 75-300 Dots per Inch (DPI). Each element is an amplitude adjustment at embedding location at this resolution.

The resolution of the watermark, in robust signaling implementations for reading by handheld scanners and mobile devices, is typically around 75-300 Dots per Inch (DPI). The resolution may be lower, to enable reading from handheld devices at greater distances, or higher for reading at closer distance and for forensic and authentication applications.

For robust signaling, each element of the watermark signal maps to an array of neighboring pixel locations in the host image. For example, in the case of applying a watermark specified at 75 DPI to a host image at 300 DPI, each watermark embedding location at 75 DPI corresponds to 4×4 block of neighboring pixels at 300 DPI. The adjustment for the watermark signal may be converted to a curved or shaped function (digitized in the digital domain) that varies corresponding to location within the array of neighboring pixel locations in the host image. For example, some implementations taper the amplitude of the watermark signal at the outer portion of an embedding location. Some implementations also shape the watermark signal so that it approximates a continuous change across boundaries of embedding locations.

The pixels of the host image may have multi-leveled values, typical pre-RIP, or may be binary bitmaps, typical of rasterized images. We sometimes referred to the watermark signal element as a "bump" which has a size in terms of the watermark resolution relative to the target image resolution (e.g., 75 DPI watermark signal at 300 DPI image is bump size 4, corresponding to host image/watermark resolution ratio, 300/75). The bump size corresponds to the size of an embedding location of a watermark signal element, in terms of pixel area and resolution of the host image. The watermark signal adjustments bump may be shaped by varying the adjustments over corresponding pixels of the host embedding location. The adjustments may vary in value in multi-level per pixel format (e.g., typically the pre-RIP color separations) or may vary in the configuration of elementary print structure post RIP. In the latter, the halftone dot pattern may be altered (e.g., by adding, removing, growing, shrinking and/or changing position of dots (e.g., halftone dot clusters or screens). Also, line screen structures may be altered to encode a bump by increasing or decreasing the line structure corresponding to ink application at the embedding location.

An embedder 10 operates on this host image to encode a reference digital watermark signal (DWM) in it. The reference digital watermark serves as a proxy for the final, unique watermark inserted in the printed piece. Using this reference digital watermark, the embedder 10 produces a marked base image and embedding parameters. In the method of FIG. 2, the embedder 10 encodes a fixed component of the final watermark in the host image to form the marked base image. The embedding parameters are used later to control the amplitude of variable watermark signal elements. These variable watermark signal elements are the modifications used to encode unique payloads in each printed piece.

In an alternative embodiment, the embedder uses the reference watermark only to determine embedding parameters at this stage. The host image is left un-marked. As in the above embodiment, these embedding parameters are used to compute a variable component. The variable component may be a combination of a fixed watermark component and variable payload component, or only a variable payload component. In some protocols, the watermark signal consists of a variable payload component arranged to facilitate synchronization, and as such, there is no significant "fixed" component. See, for example, U.S. application Ser. No. 14/724,729, which is incorporated by reference above.

As noted, the reference digital watermark is preferably formed to act as a proxy for the final watermark. Since the final watermark is dependent on a unique payload of each printed piece, it is not practical, nor necessary, to derive embedding parameters adapted for each final watermark. Instead, the embedding parameters are approximated using a reference watermark. The embedding parameters are a function of visibility and robustness metrics that govern the strength of the watermark signal at each embedding location within a host image. The embedder 10 applies different weights to robustness and visibility constraints, as set by the designer and/or derived automatically from analysis of the host image and reference digital watermark. The embedding parameters output from the embedder 10 specify constraints on the strength of the watermark per embedding location. This may be specified in the form of a scale factor and/or limits for signal amplitude in adjustment directions per embedding location.

There are several options for constructing the reference watermark. In one option, the reference watermark is a fixed component, which is common to all printed pieces. This fixed component, in one implementation, is a synchronization signal. The fixed component may also include a static payload, encoded at a different spatial resolution than the variable payload. For example, the fixed payload may be a public watermark, carrying a product identifier, such as a GTIN, at a different spatial resolution than a private, variable payload.

Examples of synchronization signals are described in U.S. Pat. No. 6,614,914. As an alternative proxy for a final payload dependent watermark, the reference signal may be comprised of a synchronization signal and a random payload signal, which is generally representative of other payload signals. In watermark protocols where synchronization is inherent in the arrangement of the variable payload elements, the reference watermark may be a representative watermark signal generated from a chosen payload. For more information, our application Ser. No. 14/724,729 (U.S. Pat. No. 9,747,656), entitled Differential Modulation for Robust Signaling and Synchronization, describes several signal structures with inherent synchronization.

Other forms of synchronization may also be employed within the encoding and decoding systems. For example, visible registration structures may be incorporated onto the package design, such as the fiducials typically employed in 2D barcode symbols like QR codes, circles or box-like line structures that form visible templates for geometric registration. Another example is to employ the orientation derived from the line screen angle as a synchronization signal.

Additional synchronization approaches may be applied that also do not require synchronization signal components or structure within the watermark signal. One strategy is to employ a search for synchronization by applying watermark extraction and payload checking operation repeatedly over an area of a signal suspected of containing a payload, each time with different synchronization parameters. Our application Ser. No. 14/724,729 describes an approach that applies filter kernels at different rotation and scale states, for example. Another strategy is to use feature recognition to approximate geometric or temporal distortion prior to payload extraction. See, for example, our U.S. Application Publication 20140119593, and our U.S. Pat. No. 8,300,884, which are hereby incorporated by reference.

Other design elements, including even VDP templates with personalized information, may be used as fiducials for geometric registration. Particular examples include personalized text and graphics, which when printed, form geometric reference markings for synchronization. The placement of text, and its alignment in rows and columns provides one form of fiducial for registration. Boxes containing variable images also have edge structure that forms a frame of reference for embedding locations for the payload. The start of a recipient's name, for example, can be used to indicate the origin of a watermark signal block, and the text itself may provide clues on how to decode the watermark signal. For example, the text may be machine read (via OCR) and hashed into a binary sequence, which is used as a cryptographic key for decoding the payload, or a key for the generation of a carrier signal (such as a pseudorandom sequence) used to modulate the payload. The text or graphics may also be transformed (e.g., via hash) into an offset value, indicating relative position of the origin of a watermark signal relative to a particular point within the image.

Returning to FIG. 2, the next stage is to compute adjustments for converting the marked base image into final marked images, each with a unique payload. Each unique payload is encoded into the host image by making a particular set of positive or negative adjustments at embedding location within each tile of the host image, where the base mark resides. Every desired payload for this particular host image, therefore, is a subset of all allowable positive and negative adjustments adapted to the host image. This stage of the method employs the embedding parameters to derive the allowable positive and negative adjustments for the host image.

There are a variety of implementation configurations for this stage. In one approach, the adjustments are generated to be applied to a pre-rasterized version of the marked base image. In this case, the adjustments for a particular payload are applied to pre-rasterized image pixels, and then a RIP converts these pixels to rasterized form for merging into a final rasterized image during operation of the press. This approach may not be appropriate as it may require too much computation during operation of the press.

In a variant of this approach, an optimized RIP is adapted to receive the adjustment quantities and locations for a particular payload and make the adjustments to the marked base image pixels within the DFE or press during press operation. This RIP is an optimized version of the RIP used in the DFE or press, which employs a Graphic Processing Unit (GPU) or like image processing logic to make positive or negative adjustments according to the corresponding strength value specified from the embedding parameter for an embedding location. Preferably, a GPU implementation executes parallel and/or vector operations on the base image at plural embedding locations where an adjustment is needed to encode the unique payload of a printed piece, applying the positive or negative adjustment with strength set by a scale factor. Of course, where no modification is allowed or needed, there is no adjustment (e.g., the scale factor is zero). This limits the number of image modifications needed to serialize each printed piece, as only embedding locations with allowable adjustments for a given payload are modified.

GPUs enable efficient transformation of groups of pixels to make additional adjustments that encode variable payload information. Examples include:
  Deforming a group of pixels, relative to a registration marker, e.g., stretching or shrinking along an axis to encode variable bits unique to the image;
  Making localized deformations, to make different changes across the image;
  Overwriting portions of the image with un-marked content to communicate variable data (e.g., with no reference signal);
  Where the watermark signal is in a particular color separation (e.g., applied by an extra plate or in the yellow channel for an image that does not otherwise need that channel), chunks of pixels in that channel are flipped, rotated or otherwise altered to carry variable data unique to the image.

All of the above GPU operations can be performed using GPU compute units with very little computational cost. Examples of GPU units that may be used to make adjustments include Pixel Shaders, Vertex Shaders and Texture Mapping Units, to name a few. These types of compute units may be employed to make adjustments to accelerate the generation of a final, uniquely marked image, in memory of the DFE or press, during a print job.

In another approach, depicted in FIG. 2, the method converts adjustments into a rasterized pixel form prior to running the print job. This pre-processing approach enables either a RIP or the press to write these pixels into the final rasterized image efficiently during operation of the press, as the rasterized pixels are simply selected from a database for a particular payload and written into embedding locations of the rasterized base image.

FIG. 2 illustrates a configuration for generating the rasterized form of the adjustments. Raster Image Processor (RIP) 12 is a rasterizer that operates in pre-processing mode, prior to the printing of unique pieces. Its role is to generate a rasterized version of the base image (Post RIP image) from which module 14 determines a rasterized form of the adjustments. We illustrate examples of adjustments in FIGS. 3A-D, discussed below.

Module 14 computes the set of all allowable positive and negative adjustments for a desired set of unique payloads. It obtains the embedding parameters that specify the allowable adjustment range that can be made for each embedding location. It then determines the allowable positive and negative adjustment for each embedding location within the allowable range for the corresponding embedding location. In some cases, no adjustment or only a positive or only a negative adjustment may be allowable. One cause for this is that the embedding parameter specifies that no change can be made, or only a negative or only a positive change is allowed, but not both. The pixels of the base image at the embedding location may already be at one end of the dynamic range or the other, such that there is no more headroom to make an adjustment that would exceed the dynamic range. Relatedly, the pixels at an embedding location may already contain a reference signal adjustment that is consistent with the positive or negative adjustment for the payload, and as such, no further adjustment need or can be made for generating an image patch carrying the unique payload at the embedding location. Another way of expressing this concept is that the base image may either:

1. Have a configuration of pixels that already yields the desired effect of the positive or negative adjustment;
2. Or be so limited that the positive or negative adjustment, if it were attempted, would not result in the desired effect of the positive or negative adjustment, and as such, is a lost cause. The inability to make an adjustment at some embedding locations may contribute minor error to the decoding of the unique payload, but this error will have little effect due to redundancy of the encoding across embedding locations.

To accommodate this approach, module 16 generates a database of allowable adjustments that are accessed at press time to rapidly update a rasterized base image into a final rasterized image. The database is unique to the particular host image, and it contains allowable positive and negative adjustments per embedding location for that host image. This includes the adjustments for each color separation which is altered to encode the unique payload. The database may be loaded into RAM, persistent memory unit, buffer or register in the DFE or press, in the form of a look up table, for rapid generation of a mask or template as each unique image is being imaged for variable marking during press operation.

Another optimization strategy is to pick payloads (symbols) that are minimally distant from each other, minimizing the number of pixels that need to be changed. Doing so may be achieved by a gradient descent algorithm to find the global minimum among two axes (minimal pixel changes and minimally acceptable symbol distance being the two axes). While this is a more computationally complex task, it is executed in a pre-processing stage to formulate sets of unique payloads prior to applying them to a host image. It need only be run once, in a pre-processing stage prior to the print job.

Figure 3A:
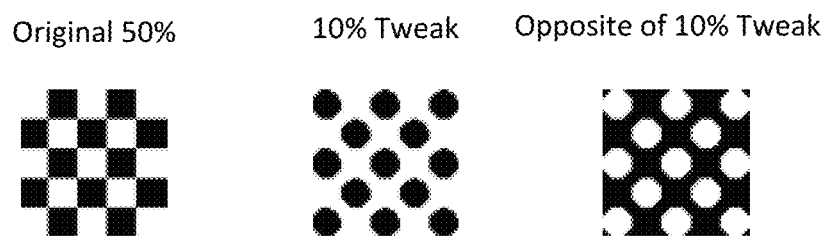
FIG. 3A shows an example of pixels at an embedding location in an image with positive and negative adjustments. The leftmost image is the original pixel array corresponding to an embedding location with 50% ink coverage (e.g., 50% screen). The middle and right images illustrate 10% adjustments in two directions, changing ink coverage to 40% and 60% coverage, respectively.

FIG. 3A shows an example of pixels at an embedding location with positive and negative adjustments. The left group of pixels is an example of the rasterized form of pixels in the original, base image within an embedding location. In all three pixel groups, the black areas represent application of ink in a color separation, whereas white areas represent no ink. The middle group of pixels is an adjustment with approximately 10% less ink (a 10% tweak). The right group has the opposite adjustment. The amount of the adjustment is specified by the embedding parameter for the embedding location. As noted, this may be a scale factor (e.g., +/−10% in this case). The positive and negative adjustments need not equal each other. This may be specified by setting particular scale factors for each direction of pixel adjustment, or using a combination of scale factor and thresholding or clipping to keep the adjustment within maximum and minimum tweak parameters.

Figure 3B:
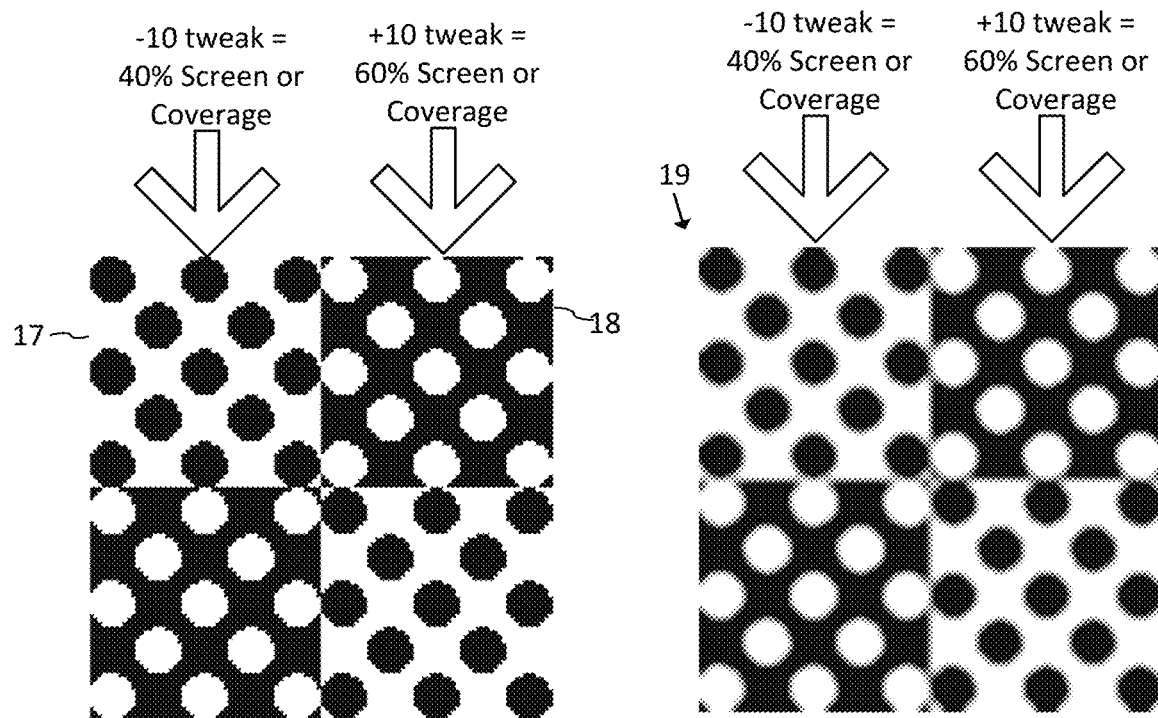
FIG. 3B shows an example of a 2 by 2 array of embedding locations, which are adjusted 10% relative to an original 50% ink coverage.

FIG. 3B shows an example of a 2 by 2 array of embedding locations, which are adjusted 10% relative to an original 50% ink coverage of a host image area. These are the same adjustments as shown in FIG. 3A, but shown as a 2 by 2 group of bumps. The left image approximates pixel areas with bump adjustments. Upper left and lower right regions have ink coverage reduced, whereas upper right and lower left have ink coverage increased 10% relative to the 50% original host image. Specifically, pixel area 17 shows an embedding location with 10% reduction, whereas pixel area 18 has a 10% increase in coverage. The right side of FIG. 3B approximates the image patch after printing.

Figure 3C:
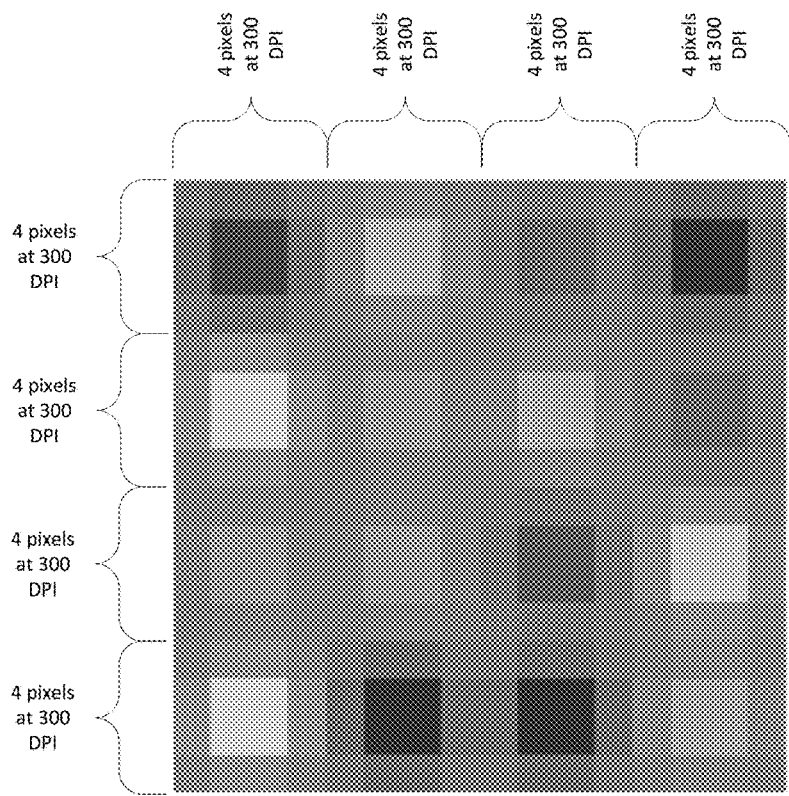
FIG. 3C shows an example of a 4 by 4 array of embedding locations. In particular, this example illustrates a 16 pixel by 16 pixel array within a 300 DPI image, where the watermark signal is at 75 DPI. Each embedding location within the 4 by 4 array of embedding locations, is a 4 by 4 array of pixels at 300 DPI.

FIG. 3C shows an example of a patch of pixels at a 4 by 4 array of embedding locations. In particular, this example illustrates a 16 pixel by 16 pixel array within a 300 DPI image, where the watermark signal is at 75 DPI. Each embedding location, within the 4 by 4 array of embedding locations, is a 4 by 4 array of pixels at 300 DPI (see 4 by 4 groups marked by brackets). The variable payload is encoded by making positive or negative adjustments at the embedding locations.

Figure 3D:
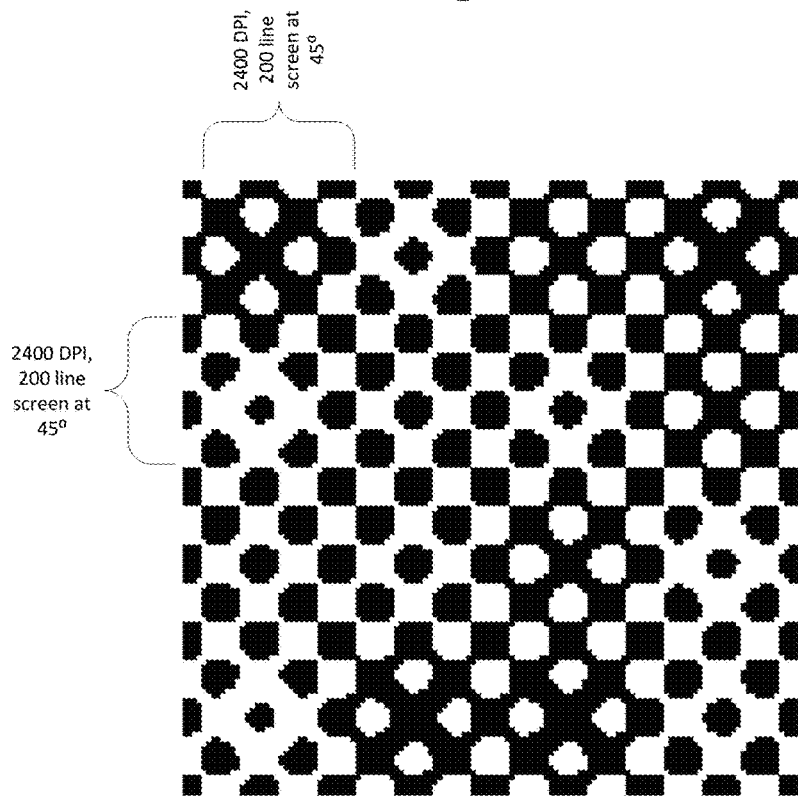
FIG. 3D is a resampling of the image of FIG. 3C at 2400 DPI, using a 200 line screen at 45°.

FIG. 3D is a resampling of the image of FIG. 3C at 2400 DPI, using a 200 line screen at 45°. This shows an example of how a set of adjusted pixels are presented in rasterized form. These types of positively and negatively adjusted pixels are generated and stored per embedding location. They are selected for insertion depending on the unique payload.

The selection of adjusted pixels is not known until the unique payload is generated. Once it is generated, the method selects the adjusted pixels needed to encode that unique payload.

Figure 4:
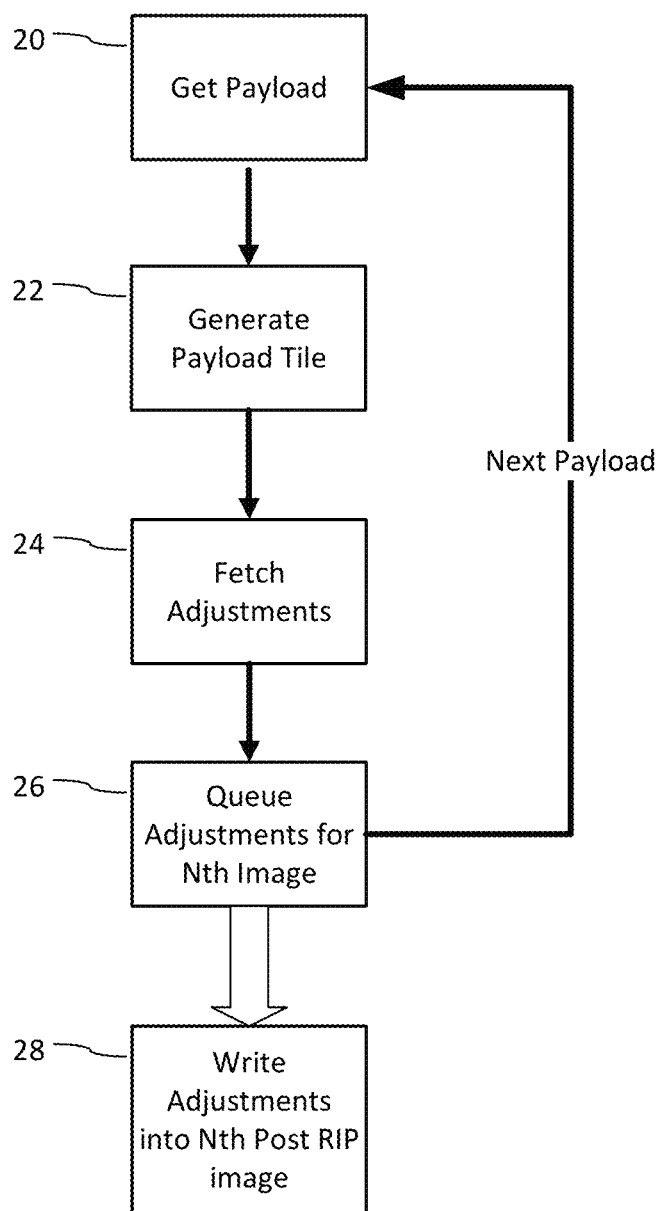
FIG. 4 is a diagram illustrating a method for generating a unique digital payload per printed piece and adjustments to embed it efficiently in a VDP environment.

FIG. 4 is a diagram illustrating generation of unique payloads and the corresponding adjustments for encoding them. For the sake of illustration, consider an application in which a set of unique serial numbers is allocated to a print job, in which each printed piece will be redundantly encoded with one unique serial number. In block 20, the process gets a serial number and supplies it to a payload generation process 22. The payload generation process 22 generates the set of positive or negative values for a watermark signal tile. Methods for doing so are described in above referenced patent literature (e.g., append CRC, error correction encode, repeat, modulate onto carrier signal such as a pseudorandom sequence, map modulated carrier signal elements to embedding locations within tile). This process may be executed in advance of the print job, or at least a portion of it may be done in advance, with the payload tiles cached and queued for use in selecting the adjustments needed for a particular printed piece. Since the payload tile is redundantly encoded in a printed piece, there need only be one tile for each printed piece.

The payload tile is mapped to tile locations within the host image. Tiles are arranged in contiguous fashion in the horizontal and vertical directions for each color separation of the image in which the watermark signal is to be encoded. While the payload is the same in the tiles, the adjustments are image and color separation dependent. Thus, when the adjustments are fetched from the database as shown in block 24, they are obtained for embedding locations in the coordinate space of the target image. At this stage, as in the payload generation process, the sets of adjustments corresponding to a subset of serial numbers is generated, cached in local memory of the DFE or press, and queued for writing into the final rasterized image prior to the print job. Various caching strategies may be employed, depending on design and capabilities of the DFE and press, to generate and cache, a mask for each unique payload, which contains adjustments or substitute pixels some number of print cycles in advance of printing a piece with that unique payload.

Block 28 depicts that the process writes the adjustments into the Nth corresponding post RIP image. The number, N, refers to the number of the final rasterized image, which is generated by applying the Nth adjustment mask or template to the base image to create the uniquely marked image that the press applies to the Nth printed piece. Referring to FIG. 1, this processing block may be implemented within the RIP 5 of the DFE 2 as a step in generating the final rasterized image, which is then supplied to the press. This may be implemented using VDP standards, where the PDL print file specifies that the template corresponding to the Nth adjustment set be combined into the static base image.

Alternatively, where the press has image compositing capability, the press combines the adjustments with the base image. See, e.g., U.S. Patent Application Publication 20070253027, relating to on-press merging, which is incorporated by reference. In this type of press, the press has a processing unit that combines static templates stored in its memory with rasterized components from the DFE for VDP. For our application, the press 4 obtains the template of adjustments from the DFE, and it stores the rasterized base image as a static template. Within the press, the processing unit 6 writes the adjustments into memory to combine the pre-rasterized base image with the adjustments.

Figure 5:
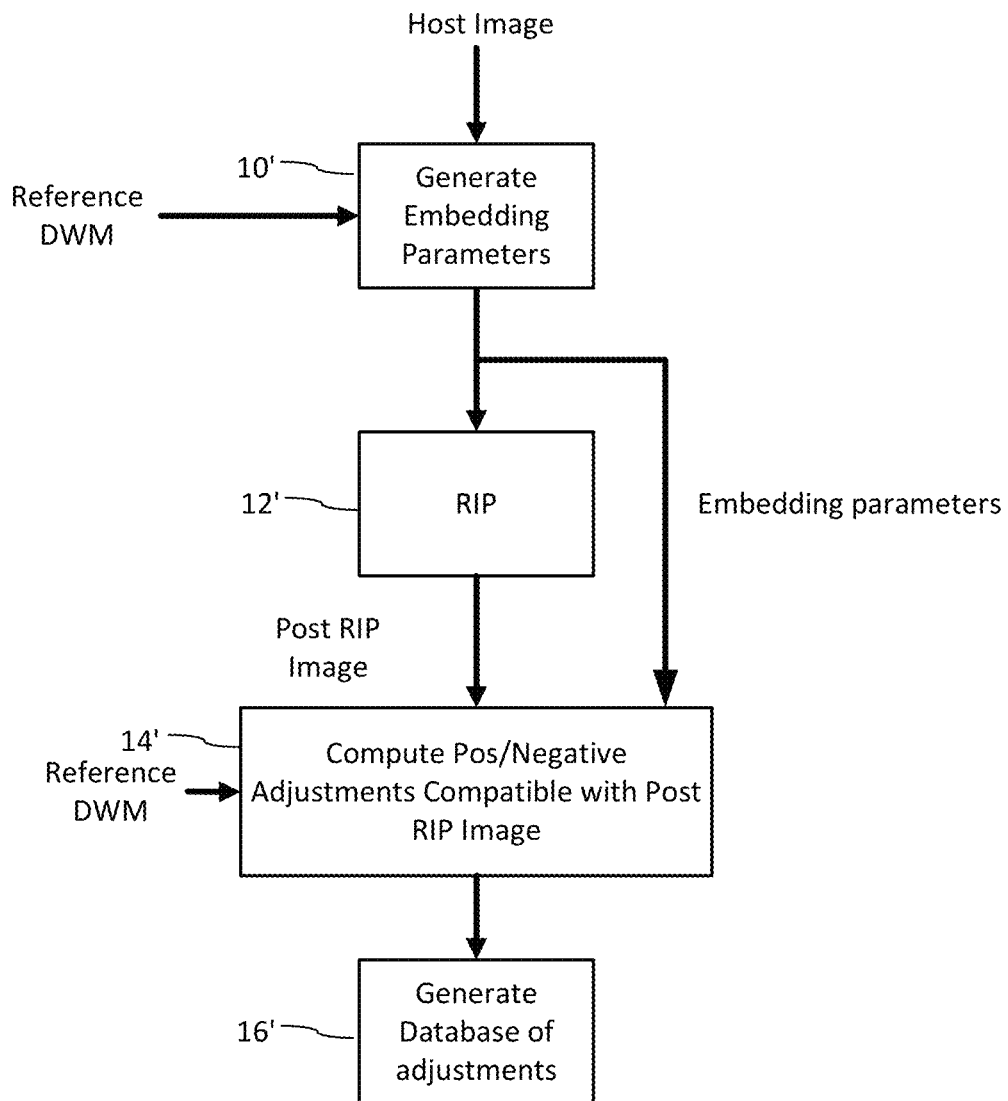
FIG. 5 is a diagram depicting a variant of FIG. 2.

FIG. 5 is a diagram depicting a variant of FIG. 2. Similar processing modules are labeled with the prime symbol, ', to illustrate that these are the counterparts to processing modules in FIG. 2, described above. The primary difference in this approach is that the embedding tool 10' does not embed the reference signal into the host image, but instead, computes the embedding parameters and defers modification of the host image.

The RIP 12' converts the host image into a rasterized form. The objective for computing the rasterized form is to facilitate generation of positive and negative adjustments in terms of rasterized pixels (e.g., like those in FIG. 3D). In particular, processing module 14' determines the positive and negative adjustments by taking rasterized pixels as input and altering the screen structure of the rasterized pixels at an embedding location to generate a net positive and negative adjustment for that location. The difference of processing module 14' relative to processing module 14 of FIG. 2 is that the positive and negative adjustments are a function of the input pixels of the host image, the reference DWM element and the positive and negative adjustment for variable payload encoding at the embedding location. The benefit of this approach is that the relationship between the adjustment to embed the reference DWM signal and the positive and negative payload adjustments are considered to compute a net adjustment. Depending on visibility and robustness constraints, the module can weight each component differently, and can also compute a net adjustment based on whether reference signal is in the same direction as the positive or negative payload adjustment.

An alternative approach is to re-order the processing so that these adjustments are determined based on host image pixels prior to rasterizing them. In this approach, a variant of module 14' computes the allowable net positive and negative adjustments due to reference signal and payload at each embedding location. It then makes the allowed adjustment for both the positive and negative payload, taking into account reference signal effect. This adjustment changes the value of multi-valued pixel elements in each color separation where the watermark is to be applied (e.g., like the pixels of FIG. 3C). The pixels are then rasterized to generate a rasterized form of the host image pixels, including a version containing a positive adjustment for each embedding location and a version containing a negative adjustment for each location, where adjustments are allowed and exist (e.g., like the pixels of FIG. 3D).

Module 16' operates similarly to module 16 of FIG. 2, described above. As noted, an alternative to post-rasterized adjustment is to generate a database of adjustments to be applied to pre-rasterized pixels. In this approach, the RIP or press retrieves the adjustments for a particular unique payload from the database and applies them to the pre-rasterized host image at embedding locations to create a marked host image.

In one mode of operation, each uniquely marked host image is rasterized in full during operation of the press and supplied to the press for printing. This approach may tend to slow down the press, and as such, may not be suitable for larger run print jobs.

In another mode, the portions of the marked host image at the embedding locations that are adjusted are rasterized during operation of the press and are merged with a rasterized version of the host image to produce a uniquely marked final image for printing.

In particular, in one embodiment, rasterized versions of positively and negatively adjusted pixels are sent to the press for embedding locations where the unique payload for a printed instance is encoded. The positively adjusted pixels have allowable positive adjustments made to them (according to visibility and robustness metrics and adapted for synchronization signal contribution) and correspond to embedding locations across the host image of the unique payload. These embedding locations correspond to the locations within payload tiles that are mapped to host image locations. The negatively adjusted pixels have allowable negative adjustments made to them and correspond to the embedding locations across the host image of the unique payload. The positively and negatively adjusted pixels may be mapped to pixel locations of one or more color separations of the host image.

These rasterized versions of positively and negatively adjusted pixels provide a database of allowable adjustments from which positive or negatively adjusted pixels are selected depending on the unique payload to be encoded in real time as the press prints each unique piece. This database is static in the sense that it is pre-generated and loaded once into the memory of the press in rasterized form prior to printing a unique piece.

During real time operation, the DFE sends a payload tile into the press, which is used to select positive or negatively adjusted pixels from the database according to the unique payload values in the tile. The payload tile is replicated across the image, e.g., in contiguously arranged blocks of tiles in horizontal and vertical directions. The adjustments to encode the payload within each of these contiguous tiles vary depending on the corresponding value at the coordinates of the embedding location in the database. If an embedding location in the host image has a logical 1 (positive 1) at the corresponding location in the payload tile, the positively adjusted pixel is selected for writing to the final marked image in memory of the press. Conversely, if an embedding location in the host image has a logical zero (negative 1) at the corresponding location in the payload tile, the negatively adjusted pixel is selected for writing to the final marked image in memory of the press.

In one embodiment, the positively and negatively adjusted pixels are subdivided into separate rasterized image arrays and selected by the processor in the press according to an alpha blend channel. A first image array comprises positively adjusted pixels, and a second image array comprises negatively adjusted pixels. The alpha blend channel comprises one or more payload tiles that have been mapped into an array of contiguous blocks of pixels in the host image. The values within the payload tiles control selection of a positively or negatively adjusted pixel at an embedding location from the first or second image arrays, respectively. In this approach, the DFE transfers the payload tile for a unique payload to the press via the alpha blend channel.

The DFE may construct the alpha blend channel as a single payload tile for a unique printed instance and issue an instruction to the press to replicate the tile across the host image. In this case, the processor in the press replicates the payload tile in contiguous blocks to map the tiles to host image embedding locations. It may replicate the tile or a set of tiles in a step and repeat fashion to cover the host image with tiles. The processor then traverses the embedding locations within the tiles, reads the payload values at the locations, fetches the selected positively adjusted or negatively adjusted pixel from the first and second arrays, and writes the selected pixel to the corresponding location within the rasterized host image.

The DFE may construct the alpha blend channel by replicating the payload tile in contiguous pixel blocks mapped to host image pixel locations. In this case, the DFE sends the alpha blend channel in a state that is ready to be read by the processor of the press to select positively or negatively adjusted pixels from the first and second image arrays, respectively.

The above approaches can be extended and adapted in various ways. In one approach, the DFE transfers a rasterized version of a marked host image to the memory of the press. This rasterized version comprises a base marked image, which includes a synchronization signal and fixed payload (variable information but fixed for printed instances of the host image). The fixed payload is mapped to a first set of embedding locations within a payload tile. During operation of the press, the press receives payload tiles for a variable payload, mapped to a second set of embedding locations within a payload tile. The press writes in the adjusted pixels according to the payload tile into the rasterized version of the base marked image to convert it to a final marked image having the synchronization signal, and both a fixed payload and variable payload elements. The variable payload makes it unique. The adjustments incorporate visibility and robustness constraints, as well as contributions of the synchronization signal at the embedding location of the variable payload.

In an application for package designs, for example, the base marked image includes a fixed payload that carries an identifier common to all printed instances of the package design image, such as a GTIN. The fixed payload is error correction encoded to form encoded bits, modulated with a pseudorandom carrier sequence, and the modulated bits are mapped to embedding locations. These modulated bits are encoded by positively or negatively adjusting corresponding pixels at the embedding locations based on the value of the modulated bit (1 for positive adjustment, and 0 or −1 for negative adjustment). Likewise, positive and negative adjustments are computed in a similar fashion for the locations of the variable payload, but the selection of the variable payload, and thus, the set of positive/negative adjusted pixels, is executed during press operation to create a unique instance. The positive and negative adjustments of the fixed and variable payload have been adapted based on adjustments to encode the synchronization signal.

Further, a visibility map computed from the host image is used to generate scale factors to scale the positive and negative adjustments for all embedding locations of the host image. These scaling modifications are applied in advance to set amplitude of the pixel adjustments in the positively and negatively adjusted pixels.

While the above example refers to positive and negative adjustments, the adjustments may be employed in various ways to implement various signaling and encoding schemes. In one encoding scheme, the adjustments are quantized into levels, and the levels correspond to different message symbols, e.g., M-ary symbols. The values in the payload tile select the quantization level, which in turn, corresponds to a pre-computed adjustment.

The adjustments may be applied to pixel value amplitude in one or more color separations. In some cases, an adjustment in one color separation is offset with a compensating opposite adjustment or series of adjustments in other color separations to reduce visibility and/or increase robustness. The payload tile, thus, may be configured to select from among more than just a positive or negative adjustment. Instead, it may select from among plural levels of adjustment, in plural color separations.

Further, the adjustments may be mapped to groups or clusters of neighboring pixels to apply a pattern of adjustments that corresponds to a variable payload element.

As noted, only a subset of the pixels of the rasterized image in memory of the press need be modified to make the final marked image unique. This reduces the amount of data transferred from the DFE to the press to specify a portion of the payload that makes a printed instance unique. It also reduces the computation within the press to selection and writing of just the adjusted pixels needed for each unique printed instance.

In some embodiments, the adjustments to make a marked image unique may be confined to one color separation. For instance, the static, base marked image may be comprised of C, M, Y, and K color separations (the process colors), and possibly other color separations (e.g., spot colors). Adjustments to serialize a printed instance may be confined to the black channel (K). This approach, however, may have greater impact on visual quality, as the adjustments in this black channel may tend to be more visible. The efficiency of single channel adjustments for the variable payload can be achieved with less visibility by placing at least partially offsetting adjustments in one or more other channels using a static reference watermark signal in those channels, such as an offsetting reference signal that at least partially offsets the synchronization signal component. In this scheme, offsetting adjustments are pre-embedded in the static, rasterized base image to pre-compensate for the later adjustments to be made for the variable payload that make a printed instance unique.

The above examples are based on an application in which the host image has variable image content. Specifically, the host image has plural color separations, and the pixels within each vary over a spatial area. In such cases, the embedding parameters are generated as a function of color, visibility and robustness metrics that vary with this variable host image content. See, for example, Ser. No. 14/588,636, Full-Color Visibility Model Using CSF Which Varies Spatially With Local Luminance (now U.S. Pat. No. 9,401,001); Ser. No.

13/975,919, Geometric Enumerated Watermark Embedding for Spot Colors (U.S. Pat. No. 9,449,357); 62/152,745, Data Hiding Using Equal Visibility Embedding For Color Designs, Ser. No. 15/137,401, Full-Color Visibility Model Using CSF Which Varies Spatially With Local Luminance (U.S. Pat. No. 9,565,335); U.S. Pat. Nos. 6,614,914, 7,352,878 and U.S. Patent Application Publication 20100150434.

Not all images require sophisticated optimization of embedding parameters. For these images, the generation of embedding parameters is simplified.

Some images include uniform tones of a particular color. That color may correspond to a particular spot color. See, e.g., Ser. No. 14/616,686, Data Hiding For Spot Colors In Product Packaging (now U.S. Pat. No. 9,380,186). The unique payload signal may be conveyed by adding a tint carrying the unique payload to the host image. In the case of spot color areas, one strategy of the embedder tool is to match the spot color with a process color tint. This strategy can introduce a color match error, due to the color difference in process color tint and spot color, as well as a watermarks signal error. In this case, the embedding parameters control the adjustment to encode a watermark signal at an embedding location that is determined based on minimizing the color match and watermark error. As described in Ser. No. 14/616,686, different weights may be applied to color match and watermark error.

For a VDP workflow, variations of the approaches of FIG. 2 or 5 generate rasterized versions of uniquely marked tints and store them in a database. For a print job, each uniquely marked tint is converted to a template or mask and queued for combination with the host image. During the print job, the RIP or press combines the uniquely marked tint for a printed piece with the host image to form a final rasterized image for printing.

Some images are either devoid of image content or are otherwise not able to be modified by other methods. In this case, the embedder tool encodes a digital payload using sparse marking strategies. See, e.g., our U.S. application Ser. No. 14/725,399 (U.S. Pat. No. 9,635,378), and Ser. No. 15/072,884 (U.S. Patent Application Publication 20170024840), both entitled Sparse Modulation for Robust Signaling and Synchronization. This type of marking differs from the others in that the signal is arranged as sparse elements on a background that is lighter (e.g., sparse dots on a blank substrate), or darker (e.g., sparse holes in a dark background or substrate). The position of the sparse elements (dots or holes) varies with each unique payload. In particular, there is a unique signal tile, carrying a unique payload, which is assigned to each unique printed piece.

In the case of sparse signaling for VDP, the unique signal tiles of sparse signal are generated and merged with the rasterized host image. Each unique tile may be generated in advance of the print job and then applied to a host image in a color separation by the RIP or press during the print job. For example, one approach in our U.S. application Ser. No. 14/725,399 generates a sparse signal tile by combining a sparse image of a binary reference signal (synchronization component) with a sparse image of a variable payload signal with a logical AND operation.

For use in a VDP workflow, one approach is to create a template or mask for each unique payload. The template or mask is a layer formed by repeating a sparse signal tile contiguously in horizontal and vertical directions to fit the host image size.

For a print job, some number of uniquely marked, rasterized images are created and queued in advance of the print job by combining these templates or masks with the host image. This process of creating uniquely marked images continues during the print job so that the next uniquely marked image is always ready to be read from memory in the press and supplied to the imager.

Applications of Serialized Printed Items

The capability to encode a unique payload throughout each printed object in a commercial printing environment enables myriad applications. One application space is serialization of product packaging. This is useful for track and trace applications, where each object is tracked through distribution. A related application is counterfeit detection. The status of an authentic objects is tracked through distribution by updating a database record linked to its unique payload with status information at points along its distribution. If a fake object is found, it either will not have a readable payload, or the payload will link to the database record of the authentic object, and the contextual information for the fake object (its location or buyer) will not match the distribution history of the authentic object. Networked mobile readers may be deployed to decode the ID, connect to the database and check the contextual information against the distribution history to determine whether the contextual information is consistent with the distribution history.

The ability to encode unique payloads efficiently in commercial printing of products and product packaging provides a practical and cost-effective framework for implementing a variety of authentication schemes. One authentication scheme is to capture an image of a printed object, calculate a hash of a feature unique to the object, and enroll that hash in a database, indexed by a unique payload embedded in the object. If the hash is known apart from printing of the object, e.g., from something applied to the object like a RF tag, hologram, substrate fingerprint, etc., it may be carried in the payload generated for and embedded in a printed image on the object or its packaging. The feature is unique to the object either because of printing or paper artifacts, or because of optical properties of some Optically Variable Device like hologram attached to the object. To authenticate the object, a hash is extracted from image captured of the object (e.g., smartphone or other image capture device). This hash is then compared with one fetched from the database using the unique payload extracted from an image of a suspect object, or one conveyed in the watermark payload of that suspect object. The above VDP methodologies are particularly suited for either embedding an encrypted hash in a variable payload within each printed piece, or embedding a variable payload that is indexed to the database entry storing the encrypted hash.

In summary, this authentication methodology includes, in one aspect, a process of either:

Storing the hash in a database and looking it up using the unique payload at the time of verification;

Embedding some encrypted version of the hash into a watermark or other machine readable symbology printed on the object.

One class of hashes include visual hashes of material micro-structure, where the unique reaction of paper and ink or structure of the paper/substrate itself is hashed. Hashes could be based on random projections of lines, as described in Voloshynovskiy, S.; Diephuis, M.; Beekhof, F.; Koval, O.; Keel, B., "Towards reproducible results in authentication based on physical non-cloneable functions: The forensic authentication microstructure optical set (FAMOS)," 2012 IEEE International Workshop on Information Forensics and Security (WIFS), pp. 43-48, 2-5 Dec. 2012, which is hereby incorporated by reference.

Another class of unique features are high resolution barcode-like patterns that are hard to photocopy like the ones in US20080301767, which is hereby incorporated by reference. See, also, Anh Thu Phan Ho, Bao An Hoang Mai, Wadih Sawaya, Patrick Bas. Document Authentication Using Graphical Codes: Reliable Performance Analysis and Channel Optimization. EURASIP Journal on Information Security, Hindawi, 2014, pp. 10.1186/1687-417X-2014-9, which is incorporated by reference. To employ this approach, the unique payload is used to provide cryptographic key needed to generate a pattern. This pattern is then used for correlation to authenticate the object. The unique payload provides the key either by carrying it, or carrying an index to it in a database.

Another application is for serializing shipping containers for improved logistics. Traditional barcodes are used extensively in distribution and shipping of objects. However, as noted, they are limited to a particular location on the object, making them more difficult to read (blocked from sensor view), susceptible to damage or loss, and unreliable. The above signal encoding replicates a unique identifier across an object's surface (e.g., in tiles of about 1 square inch). This signal encoding is used to pre-serialize an object when it is printed in the workflow of a commercial press. This pre-serialization avoids the need to add labels later, saving time and cost added by the infrastructure needed to support printing of labels and data management of the information carried in barcodes on the label. It also is compatible with schemes in which labels are added because the label only obscures a portion of the surface, leaving plenty of encoded signal in other areas of the surface from which to extract the payload.

In addition to the above benefits, the inclusion of the payload in the container also enables it to be employed within distribution centers for material handling, tracking, related applications, without the need for yet further traditional barcodes. Replicating the signal on the container enables it to be read from many different positions by machine vision and other camera based auto-ID equipment in the distribution center. This provides savings in auto ID equipment because it achieves greater reliability and speed for less equipment and handling cost. It lowers equipment cost as the machine vision system can reduce the number of cameras per read station. Typically, the read station employs several cameras to ensure each package is read as it moves on a material handling system, such as a conveyor. It also reduces the need for putting traditional barcodes on multiple sides of the container.

The logistics use case begins with the creation of serialized containers. Using above described technologies, a commercial printing system inserts a unique payload in each container as it is printed. One approach is to encode a tracking number in the payload. Another is to encode a unique number to which a tracking number is later assigned within the database of the shipper. The latter approach enables the payload to be associated with multiple tracking numbers over time. The history of each shipment may be associated with the payload of the container. For any particular shipment, only one tracking number is associated with the payload at a time.

The above encoding methods enable the payload to be applied using various strategies, each tailored to the application and package design, creation method, and material (e.g., cardboard, plastic, etc.). They work equally well on rigid containers made of cardboard or other paper based material, as well as rigid and flexible containers made of plastics, including flexible pouches or envelopes.

The encoding strategy is preferably adapted for the design and image content. Even within a given package, multiple strategies are employed to handle variable graphics, uniform tones and spot colors, and blank areas. Sophisticated package designs with variable graphics and images employ encoding that leverages visibility and robustness analysis to pre-determine the embedding parameters. Process color tints or sparse marks are useful for parts of a package design with uniform tones, including uniform tones printed with spot colors, or blank areas. One example of a process color tint is a tint comprised of 4% C, 2% M, 2% Y, which is suitable for near white or blank areas. Another example of a process color tint is one that is used to approximate spot colors. A spot color area in a design file may be screened back and combined with a process color tint, such that the area matches the original color prior to screening back the spot color. The spot color area may also be approximated with a different spot color and process color tint combination. For more on spot color and tint methods, please see Ser. No. 14/616,686, Data Hiding for Spot Colors in Product Packaging. For more on sparse marking, please see our U.S. application Ser. No. 14/725,399, Sparse Modulation for Robust Signaling and Synchronization.

Additionally, these methods are suitable for print runs in which a material layer bearing the encoded payload is overwritten unto the package, such as ink jet application of ink or an application of a varnish, lacquer or UV cured coating. Please see our U.S. Published Application 20020118394, which is hereby incorporated by reference.

They are also suitable for embodiments in which the imager of the press system has the capability to apply the signal adjustments for the unique payload using laser, photographic, thermal, or other technique. These adjustments may be made to the substrate, prior to printing the design on it. Alternatively, they may be made over the ink layers printed on the substrate.

In one approach, a first print run is dedicated to applying a static image to N printed pieces. A second print run then applies different adjustments for the variable payload to the N printed pieces.

Alternatively, the imager of the press has plural application stages that apply different marking to the same substrate area of a printed piece, before advancing to the next printed piece.

For example, packages may be pre-printed with the exact same image in a first print run, and then serialized by running the pre-printed package substrate through a fast, variable marking system, which applies adjustments via material application (ink or varnish) or exposure to pressure, heat, laser, or photographic marking methods. This fast, variable marking system may also be integral to a traditional press assembly, so that printed pieces pass through a digital marking station after conventional printing.

A variable payload marking system may also be integral to the digital press system, in which static images of spot and process colors are applied to a substrate, using a first imager assembly, and the adjustments for the digital payload are applied earlier on the substrate, or later, after the spot and ink layers are applied.

The encoding method is preferably tailored to the color scheme and branding of the shipper, and the technologies described above have the flexibility to accomplish this tailoring. The process colors of the digital press, for example, may be used to apply the same distinctive design on each container, and also apply adjustments to each printed piece to insert a unique payload. Some shippers may use a spot color or spot colors associated with corporate branding. The color scheme for the branding may be accommodating using techniques referenced and described in this document.

For the sake of completeness, we also note that other serialization methodologies may be used for this use case. Please see, for example, methods for serializing print media in U.S. Patent Application Publication 20150016664, which is hereby incorporated by reference.

The unique payload marking is also designed to be compatible with inexpensive and ubiquitously deployed camera based imaging devices, for both industrial and consumer use cases. In the industrial use case, such as in a distribution facility, auto-ID equipment is typically configured to read traditional barcodes. Such devices typically use red illumination, such as a red LED, to read barcodes from images captured in a spectral neighborhood around 660 nm. For example, this equipment often employs red illumination and monochrome image capture, e.g., using a CMOS array. Some equipment employs color sensors and/or other forms of illumination (e.g., pulsing LEDs) to capture image content in additional spectral bands. For more on this topic, please see our published application 20130329006, which is hereby incorporated by reference. To extend the compatibility of the signal encoding methodology, one preferably should design it to handle the more limiting case (e.g., reading at 660 nm). The payloads, therefore, are inserted so as to be read from images captured in the spectral range of the more limited capture devices.

In the consumer use case, digital cameras on mobile phones, tablets and other consumer electronics typically have color sensors to capture color pictures and video. These devices use color filter arrays to capture color images in which each pixel has three or more color separations, such as RGB. Since the payloads are extractable for the more limited case of certain traditional barcode scanning equipment, they are also extractable from RGB images or video. Please see incorporated documents for more on extracting payloads from camera captured images, including, for example, U.S. Published Applications 20130329006, 20100150434 and 20140119593, and U.S. Pat. No. 6,614,914.

Figure 6:
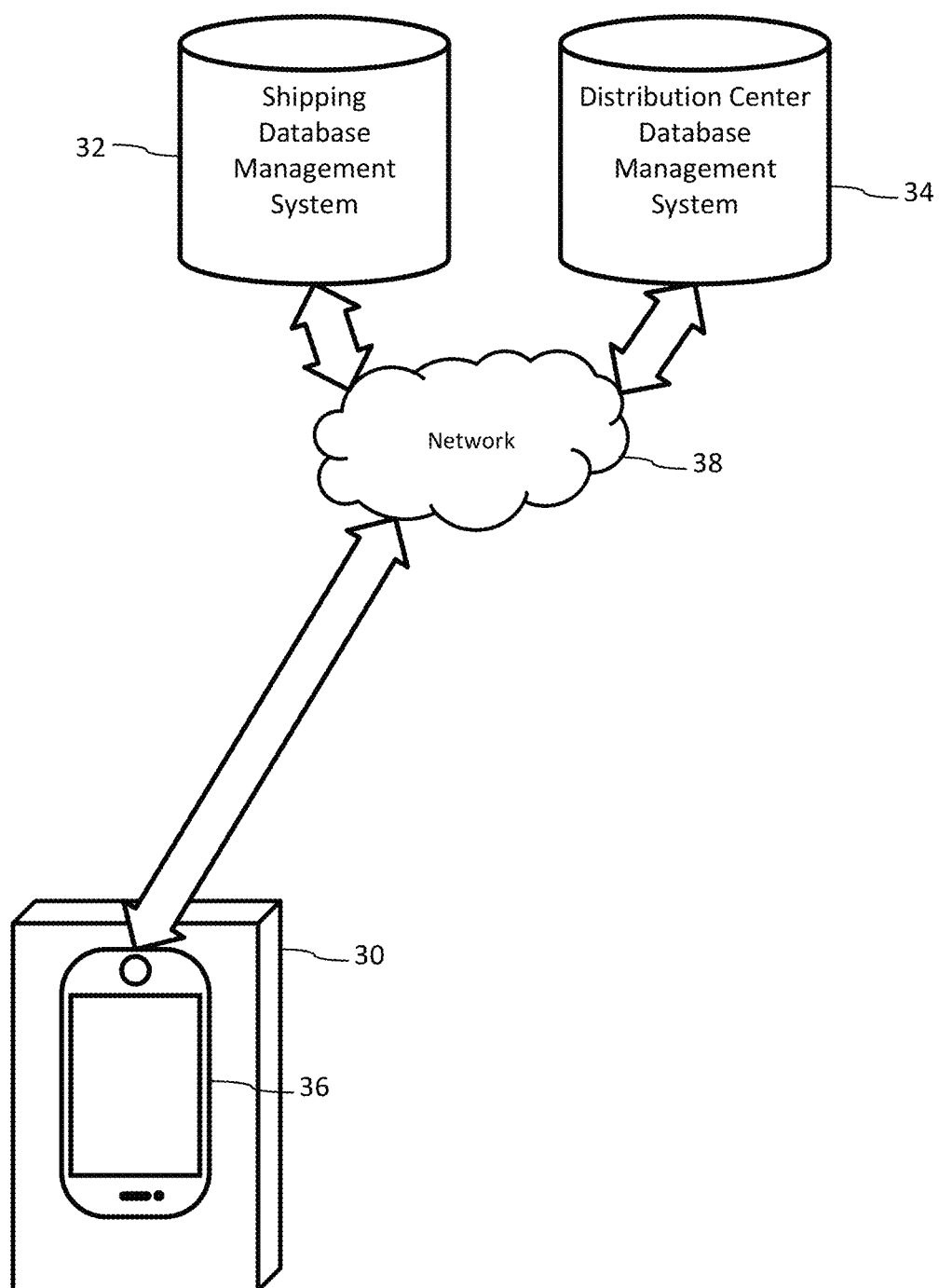
FIG. 6 is a diagram illustrating use of the unique digital payload on a package for different applications.

Having described the unique marking process and digital capture and extraction of the payload, we now describe how the unique payloads are used. FIG. 6 is a diagram illustrating applications the unique digital payload on a container. When a container 300 is put to use, the unique payload encoded on it is assigned an application number for that use. For example, in a shipping application, the payload is assigned to an active tracking number in a shipping database management system 32.

Other applications can assign different meaning to that container by assigning the payload to an application number within the application. For example, FIG. 6 shows another application in which the payload has a different meaning for use in a distribution center database management system 34. For example, it may be assigned to an application number within the distribution center object handling system. Various other applications may associate the payload with other metadata particular to the application.

The status of the container is updated by reading the unique payload and updating the database management system for the desired application or applications.

The unique payload woven over the surface of the container enhances both the consumer and industrial use case. From the consumer perspective, the technology makes shipping easier and tracking more reliable. The consumer obtains the container 30. To set up a shipment, she scans the container 30 with the camera of her mobile device 36. An application running on her device (e.g., the shipper's mobile application) uses the mobile operating system to display a user interface, receive input via the touch screen, voice command, etc., capture images of the container, and establish network communication through network 38 to the shipping database management system 32.

The application decodes the unique digital payload from images captured of the container 30 and provides it to the database 32. In response, the database validates that the unique payload is valid and allows the consumer to set up a shipment using the container 30.

To assign a destination, the application provides options for entry of the destination address. One option is for manual entry of the address via the user interface of the application. Another is selection of a contact within the contact database on the mobile device. In the latter case, the application has access to the contact database maintained by the mobile operating system. By selecting the contact, the consumer associates the contact's name and address with the destination of the shipment. The application provides the destination address, source address, shipping priority and user account identification to the database 32. The latter may already be associated with the consumer's account with the shipping operation. The application also provides for mobile payment of the shipping cost. The database 32 checks the validity of the information provided and sends back the shipping instructions to the consumer for verification. When the consumer has verified the shipping information and completed payment with the shipping system 32, it activates the unique payload by assigning a tracking number, setting up a database record for managing shipment, and issuing instructions to its shipping infrastructure to pick up the container from the consumer and deliver it to the destination. No additional labeling need be applied to the container to complete the shipment, though as noted, other labels and barcodes may be applied as appropriate without impacting the readability of the payload.

From the shipper's perspective, its personnel and handling facilities are equipped with camera based imaging devices capable of imaging the container and extracted its unique payload. When the shipper's delivery personnel or auto-ID equipment encounter the package, e.g., during pick up, transport, handling in distribution centers, and delivery at the destination, they read the payload from images captured of the container with a camera based imaging device. As noted above, the payload may be read with camera based barcode scanning equipment and mobile devices. At each point, the reading device updates the shipping database 32 with status information, such as location, time, personnel who handled it. Database 32 makes a subset of this information available to the consumer via a web interface (including the mobile application). The consumer may also opt to have the database 32 issue shipping status notifications to the mobile device via notifications to the mobile application, text messaging, and/or email.

Personnel of the shipper are equipped with readers that enable them to view shipping information linked to the unique payload. Since the container does not need, nor necessarily use human readable destination information, the shipper's personnel obtain this information through the user interface of the application running on their reader devices. These may be ruggedized mobile devices, such as a smart phone or tablet.

Figure 7:
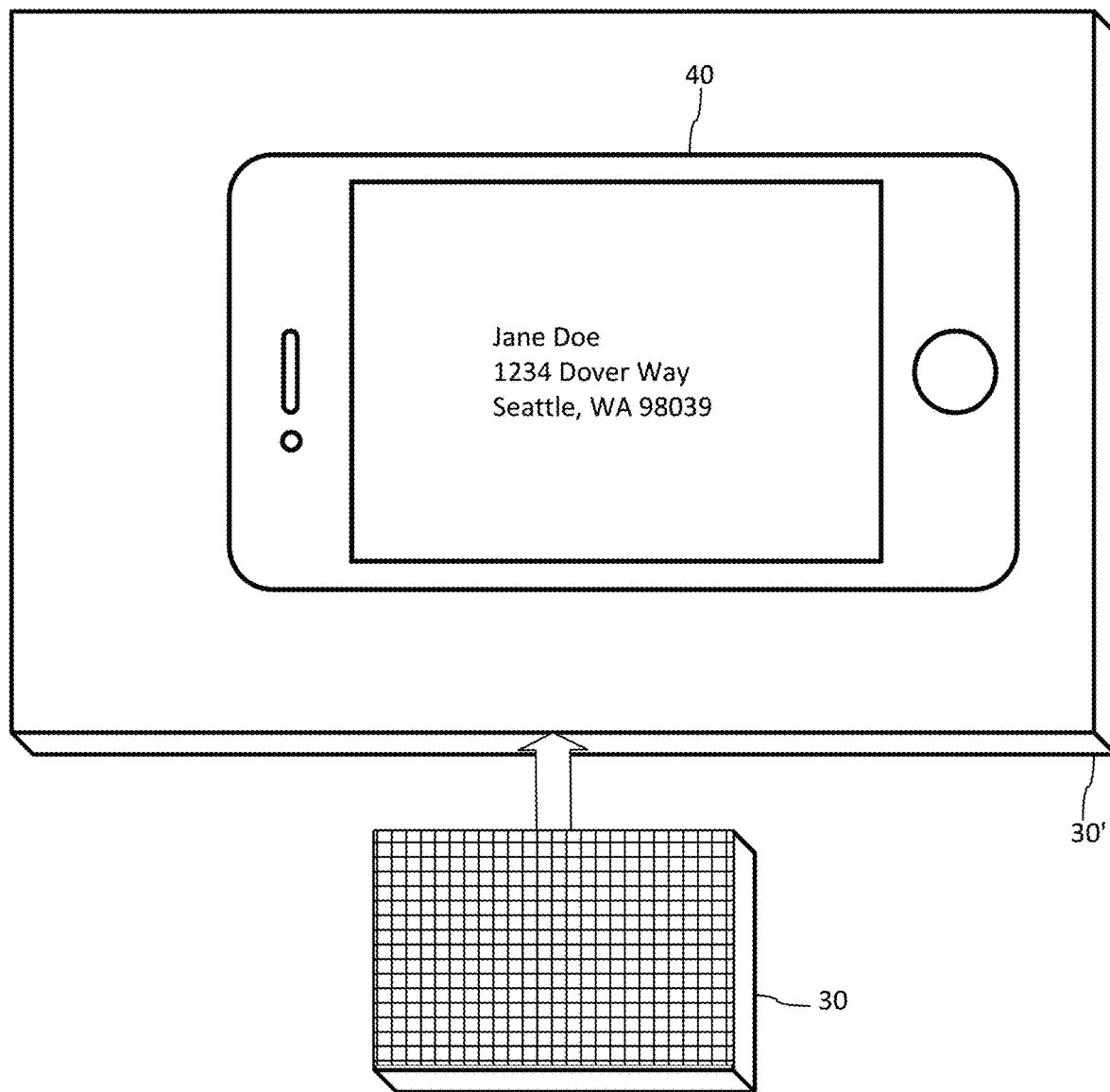
FIG. 7 is a diagram illustrating an augmented reality user interface on a mobile device for viewing labeling information linked to a unique payload.

FIG. 7 is a diagram illustrating an augmented reality user interface on a mobile device for viewing labeling information linked to a unique payload. The container 30 lacks any overt labeling or shipping information because that information is linked via the unique payload encoded over the surface of it. The depiction of the surface of the container 30 in FIG. 7 shows a pattern of lines, which is merely representative of any type of graphic design elements, including logos and other branding, text, graphics, images etc. that the shipper wishes to put on its containers.

At any point in the delivery process, a shipper employee may pass his mobile device 40 over the surface of the container 30' to capture image frames of it via the camera in the device. This operation is shown in FIG. 7 as the container 30 being positioned under the mobile device 40 (the arrow from 30 to 30'). The device 40 decodes the unique payload and retrieves the shipping information from the database 32 via network 38. It then renders the shipping information on the display of the mobile device 40. This operation may be implemented as an augmented reality (AR) display, in which an image of the container 30' is depicted on the display of the mobile device 40 from live camera feed or snap shot, with a machine rendering of a label showing pertinent destination information as shown, superimposed on the camera feed or snap shot of the container on the display of the mobile device 40. For more details on augmented reality implementation, please see 20140119593 incorporated above. Likewise, the consumer mobile application may also provide a similar AR display, which different renderings provided based on the state of the container (available for new shipment, in delivery mode for acceptance, etc.)

The user interface of the mobile device may be implemented on a touch screen, enabling the employee to enter status information, including location, time, stage of shipment (e.g., pick up, delivery, transport, distribution center, etc.). Several different form factors may be deployed, depending on the pragmatic needs of the shipper personnel. One form factor is a delivery truck unit that allows the delivery person and truck loaders to present objects to an image capture device (device with digital camera) and display shipping information. Another form factor is a wearable computing device (e.g., like Google Glass wearables or the like).

Material handling equipment and machine vision systems are additional examples of devices that assist in delivery and update status of the container. Drones, robots, and other unmanned vehicles used in container transport are just a few additional examples.

When the container is delivered, it again enters a consumer's domain. At this point, the delivery person or unmanned delivery vehicle makes a status entry to update the status to "delivered." The recipient may use the shipper's mobile application, as the sender did, to scan the container, access shipping information, and indicate acceptance of the container. As noted, the consumer's scan of the container may present an AR experience with information about the package that is uniquely pertinent to the recipient rendered on the recipient's mobile device.

It is possible for the container to be re-used, so the database system 32 de-activates the unique payload of the container from the tracking number. This allows the container to be re-used, in a similar fashion. One example of re-use is for merchandise returns, for example.

Additional validation steps are preferably employed to improve the efficiency and reliability of shipping. When activating the shipment upon a digital read of the payload in the container, an electronic notice is sent to the logistics supplier and intended recipient, showing shipper, addressee, and description of the pending delivery, etc. The system's validation process sends an electronic notification to the sender and recipient (e.g., via electronic mail, mobile application notification, text message, or the like), asking for confirmation of the shipping details. The sender and/or recipient then, in response, provide any additional instructions for the shipment, including any special requests to the logistics supplier. The recipient confirms, preferably prior to shipment, mitigating risks of misaddressing shipment. Through this process, the logistics supplier has an opportunity to respond to special requests or provide details of estimated delivery. Upon receipt, the recipient captures an image of the container with his mobile device through a mobile device application. The mobile application sends a notification to the shipper and logistics supplier of receipt, closing the loop. If the recipient wishes to initiate a return, he does so by replicating the shipment process, an indicating that a return is being requested.

Further Disclosure—Sparse Marks

The foregoing discussion focused on embedding variable data digital watermark signals in host artwork. In the following discussion we elaborate on variable data printing of sparse watermarks.

As noted, sparse watermarks typically comprise sparse elements on a background that is lighter (e.g., sparse black marks on a white substrate), or darker (e.g., sparse holes in a dark background). The pattern of the sparse elements (dots or holes) varies with each unique payload. In particular, with variable data printing there is a unique watermark signal block, carrying a unique payload, which is conveyed (e.g., by printing or texturing) to each unique item. The items can be, e.g., packaging for consumer or pharmaceutical goods, or adhesive labels to be applied to such items. A particular example is adhesive labels applied to fruit, such as apples or bananas. Each label carries a payload that identifies, through an associated database, metadata about the labeled item. This metadata can include, e.g., the date a fruit was picked, the farm on which it was grown, the row within the farm where the fruit was picked, the harvester that did the picking, etc. Additional information about the fruit's journey to a supermarket can also be included in the metadata, such as the shipping container used, the waypoints along the journey, the date and time that the fruit was moved from each transport or storage location to the next, and transport/storage temperatures encountered along the way. Such metadata is sometimes termed "provenance" metadata.

In the case of a manufactured item, such as a box of oat cereal, the provenance metadata can additionally include source information about component ingredients. For example, the oats may be identified by the farm on which they were grown and the circumstances of their cultivation (e.g., organic certifications, pesticides applied and the dates of application, harvest date, etc.) Similarly, the sugar may be specified by its place of origin, the labor practices employed in its cultivation and processing, etc., etc.

Information other than provenance information can be among the item metadata. For foods, calorie and nutrition information are exemplary.

In some arrangements, the compliant device (e.g., smartphone) that detects the serialized watermark payload is configured to launch an action in response—such as to pass the payload data to a remote web server. The remote server can then take a responsive action, such as composing a web page with the metadata just identified.

In other arrangements, the compliant device (e.g., smartphone) may forward the payload to a remote server, together with context information sensed by the smartphone (e.g., geolocation information identifying the location where the device encountered the watermark payload). The remote server can then take a responsive action that depends both on the payload information and the context information (e.g., geofencing).

In some embodiments the web server is configured to authenticate the item (or not) in response to the watermark pattern on the item. In one particular example, the item has distinguishing visible features that are cross-checked to ascertain they correspond in an expected manner with metadata associated with the serialized payload data. In some embodiments the visible features are alphanumeric indicia printed on the package, such as a lot and date code on a pharmaceutical box. These indicia can be recognized from the captured image, or typed-in by a human user of the smartphone. The web server accesses metadata associated with the serialized item payload. One item of this metadata identifies the particular indicia that is expected to be found on the item. If the expected and actual indicia data correspond as expected (e.g., they match), the server sends a response to the smartphone indicating that the item is authentic. If the two data do not correspond as expected, the server sends a response to the smartphone indicating that the item may be a counterfeit.

Correspondence between metadata and information received from smartphone may be otherwise than by simple matching. For example, the server may receive indicia data from the smartphone and apply a hashing function to it before comparing with stored metadata. If the hashed indicia match the stored metadata information, then the item is authenticated. This information is then communicated back to the smartphone, or other user device. (Authentication by public/private key cryptography can be similarly performed.)

The information received from the smartphone may be other than alphanumeric indicia. For example, it can comprise data decoded from a barcode or other overt 2D symbology printed on the item. Such data can be cross-checked for correspondence with a code extracted from a serialized watermark payload to determine item validity.

In still other embodiments, in item can be authenticated based on serialized watermark payload data, in conjunction with data derived from a unique texture pattern defined by fibers comprising a cardboard item container, or other item-related surface. Image data depicting such texture pattern, or identification data derived from it, can be sent from the user device to the remote server. Again, the server determines whether the received information corresponds in an expected manner with metadata associated with that particular item via the decoded watermark payload. (Examples of microstructure patterns that can be sensed from item surfaces, and their use as unique identifiers suitable in authentication applications, are disclosed in Alpvision patent publications US2017132465, US201126253 and US2008219503. Again, hashing, or public/private key cryptography can be employed in such arrangements.)

In still other embodiments, authentication proceeds based on serialized watermark data conveyed by an item, in conjunction with non-image data sensed from the item. One example is data sensed from an RFID chip conveyed by the item or its packaging.

Sometimes item authentication is performed by reference to technical measurements about the watermark quality, e.g., looking for degradation of watermark signals due to copying.

Some of applicant's previous U.S. patent publications dealing with item authentication include 20170061563, 20070187505, 20060115110, 20040263911, 20030112974, and 20020099943, and pending application Ser. No. 16/937, 514, filed Jul. 23, 2020 (U.S. Pat. No. 11,636,565).

The serialized payload conveyed by a watermark may be of the SGTIN-96 variety (96 bit serialized global trade item number), as specified by the GS1 organization. That is, the watermark may convey 96 bits of payload information—part of which represents a 14 digit GTIN identifier, and part of which (e.g., 38 bits) indicate item serialization.

In a particular embodiment, the sparse watermark takes the form of a pattern of contrast marks formed on a white label. These marks can be small, e.g., about 170 microns across, and a block of such marks may be no larger than a postal stamp, e.g., spanning an area totaling just four square centimeters. More typically, multiple identical blocks are tiled to span a larger label (or surface)—such as may be applied to a can of soup (or a pharmaceutical box). Each label can convey, in addition to the watermark pattern, text information, a brand logo, and/or additional artwork. In some arrangements, the printed marks of a sparse watermark pattern occupy areas of a label not occupied by conflicting elements, such as logo or text. The marks can be formed by various print technologies. An exemplary embodiment employs a high speed industrial inkjet marker (a "printbar"), which ejects microdroplets of ink from a linear printhead that spans a paper path for print media. (Such printheads are available from vendors such as Graph Tech USA and Fujifilm.) In some embodiments, the printbar is used in an offset press—applying inkjet droplets to a substrate that, before or after, receives ink from one or more plates.

Figure 9:
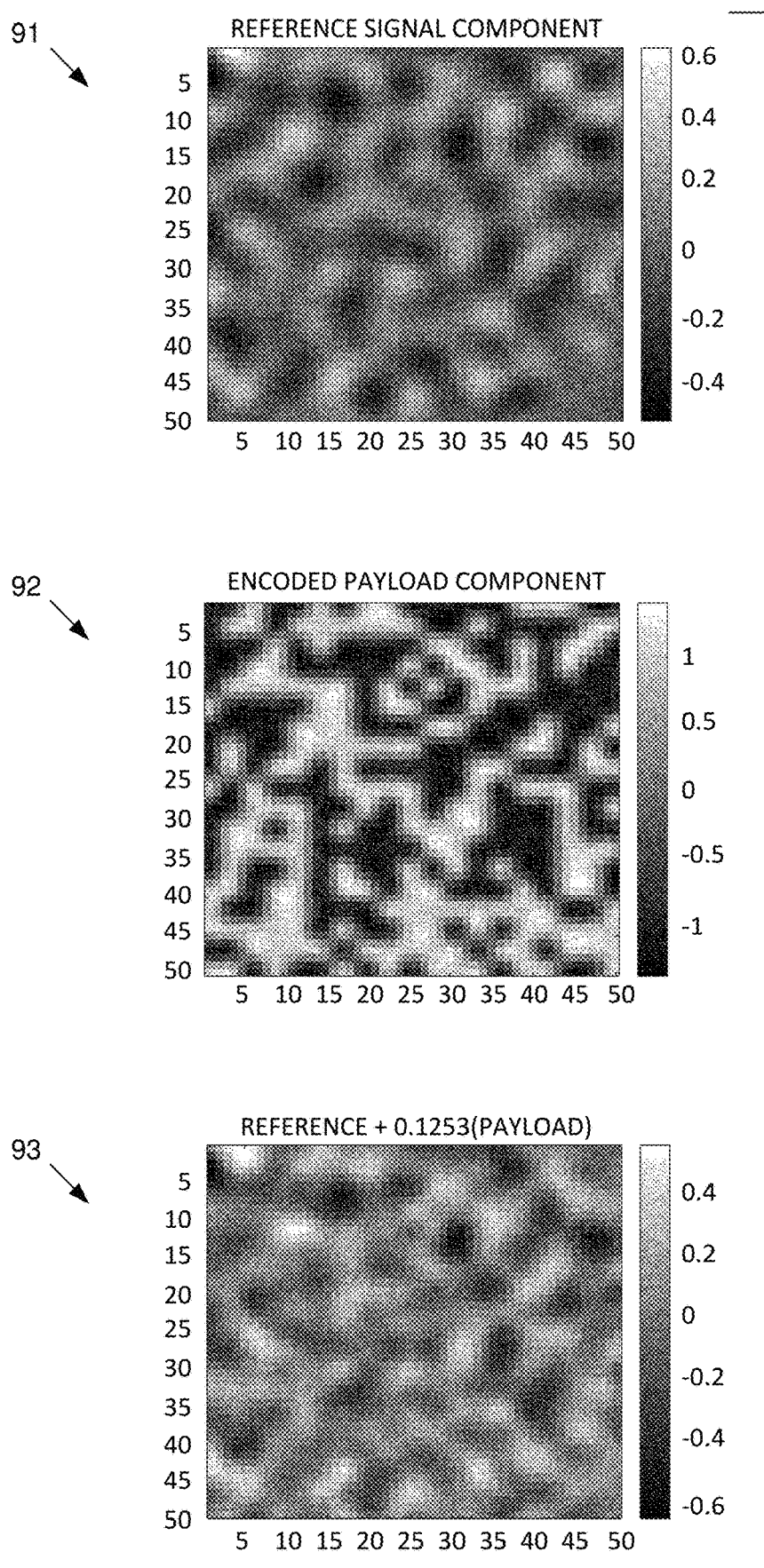
FIG. 9 illustrates that a continuous tone watermark can be formed as a weighted combination of a reference signal component and an encoded payload component.

Sparse marks can be created by various techniques, as detailed in our patent publication US20190332840. Referring to FIG. 9, many techniques start with greyscale representations of spatially-corresponding reference ("synchronization") and payload signal components 91, 92 of a "continuous tone" watermark. In one particular arrangement, these two components are summed in a weighted ratio (e.g., 8:1, favoring the reference component), and the resulting composite signal 93 is then thresholded to identify locations of signal extrema (e.g., the darkest greyscale locations). Dark marks are then placed at corresponding locations in a watermark signal block, which can comprise an array that is, e.g., 64, 96, 128 or 256 cells on a side.

In a different arrangement, the J darkest locations within the reference signal block 91 are identified, and dark marks are placed at J corresponding locations in a watermark signal block. The next-darkest K locations are also identified in the reference signal block. Each spatially-corresponding location in the payload signal block is then examined. If the corresponding payload signal value is also dark (e.g., a greyscale value below 128), then a mark is placed at that location in the watermark signal block, else that location is left vacant. This process results in about J+K/2 dark marks in the watermark signal block.

Further Disclosure—Reduction in Data Storage and Bandwidth

Figure 10:
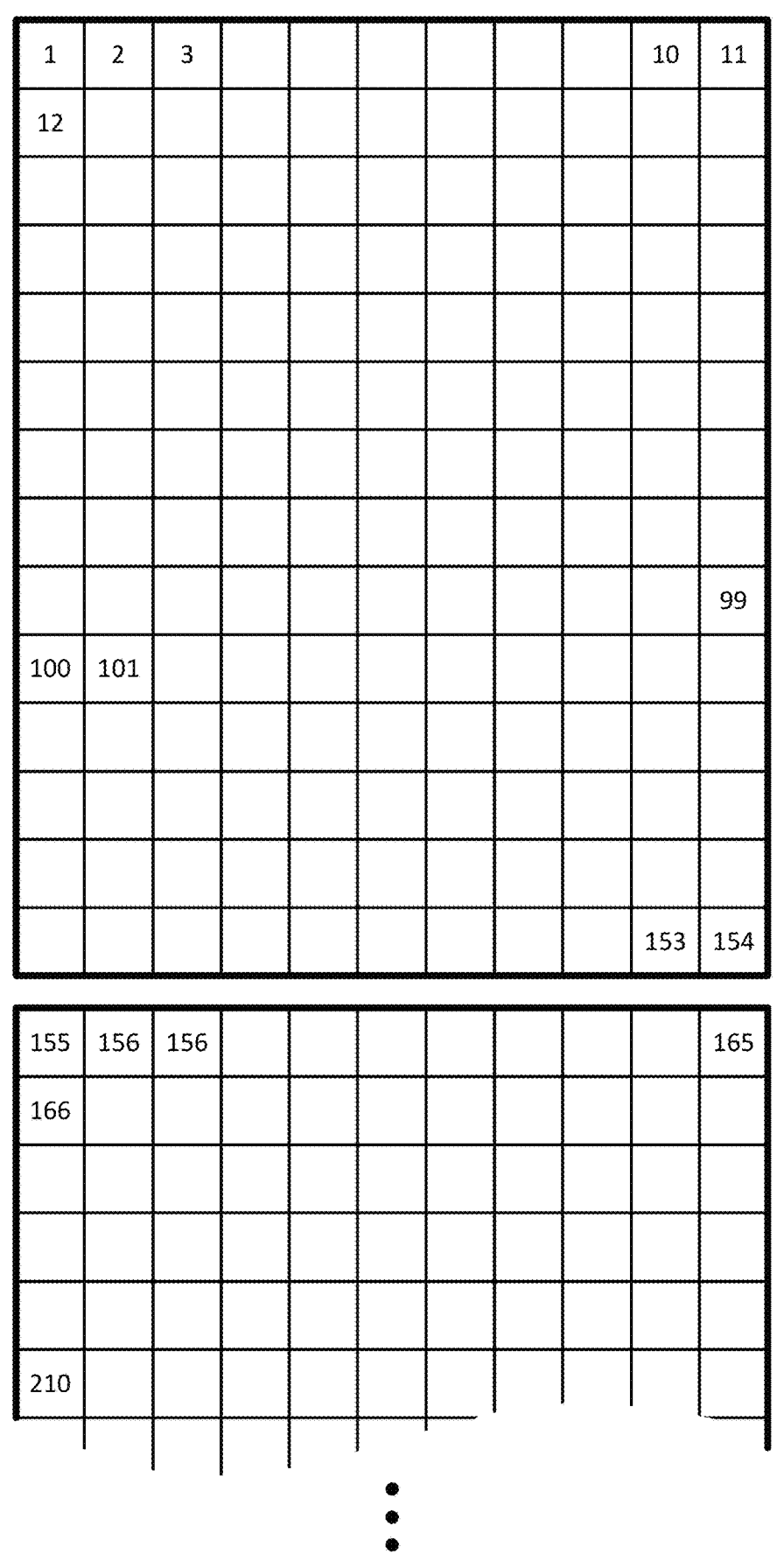

As noted, variable data printing of 2D codes aims to create and print a multiplicity of unique watermark patterns, each representing a different payload. In some embodiments, multiple different patterns may be formed on a single substrate, such as a sheet or roll of label material. FIG. 10 illustrates how 154 different labels may be printed on a single 8.5"×11" label sheet, followed by 154 further labels on the next sheet, etc. A print run may comprise hundreds or even thousands of such sheets—each inch of each sheet carrying a different watermark signaling pattern than its neighbors.

Figure 11:
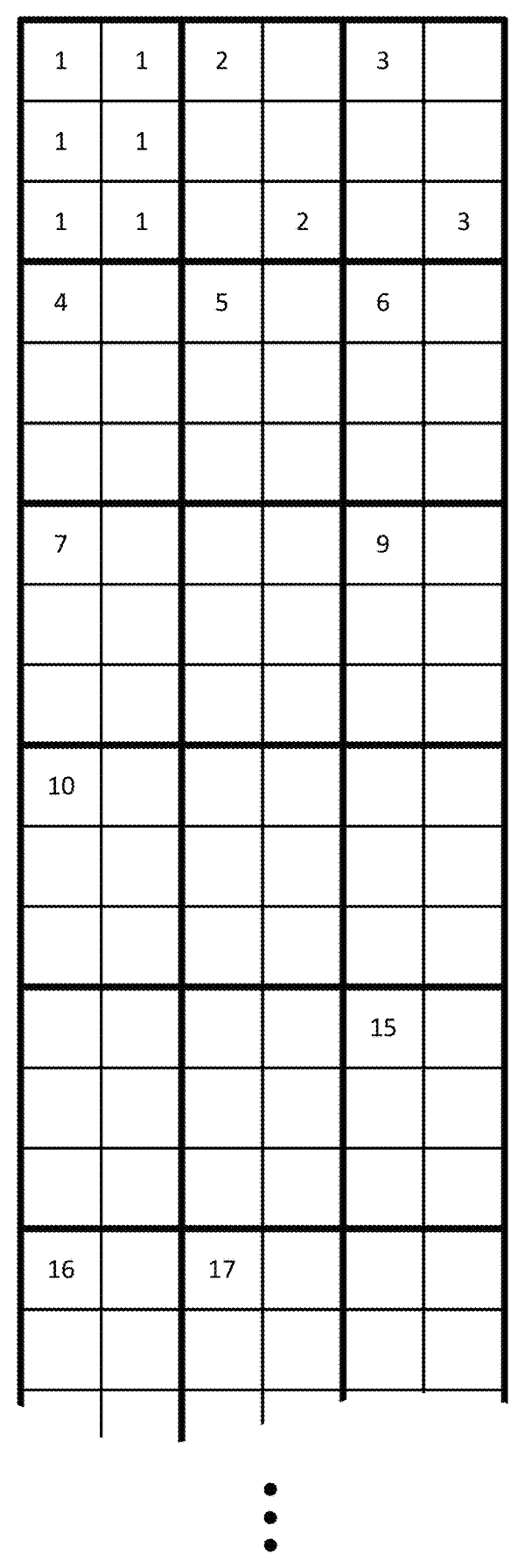

Sometimes the printed item is not a postage stamp-sized item, but rather is a larger label or packaging substrate, which is tiled across some or all of its extent with blocks of sparse watermark pattern. FIG. 11 shows an excerpt from a roll of substrate that is printed, three-across, with labels. Each label is tiled with a 2×3 array of watermark blocks representing the same payload. The printed roll may be a thousand or more feet in length.

In both instances, the volume of image data required to represent watermark signal blocks spanning the entirety of the print surface can be enormous. In applications in which the print files are PDFs, the files can reach terabyte size. Such file sizes are impractical for economical storage and transport (e.g., from a graphics arts firm to a printer facility). Such data volumes can also tax the RIP engines used in most print systems, assuming the media is printed at high rates (e.g., presses running at rates near one hundred linear feet per minute).

To address these problems, applicant has found it advantageous to separate the watermark signal component into two parts: a substantially fixed (static) part, and a variable part. The fixed part is stored, or transmitted, just once. The variable part is stored or transmitted as many times as there are different watermark blocks in the print job. However, with the fixed part omitted, there is less information in the variable part—opening opportunities to economize on storage/transmission.

Figure 12A:
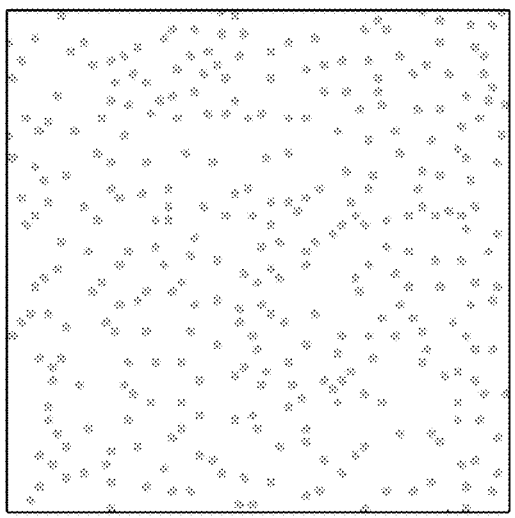
FIGS. 12A, 12B and 12C show sparse watermark patterns, each encoding a different payload.
Figure 12B:
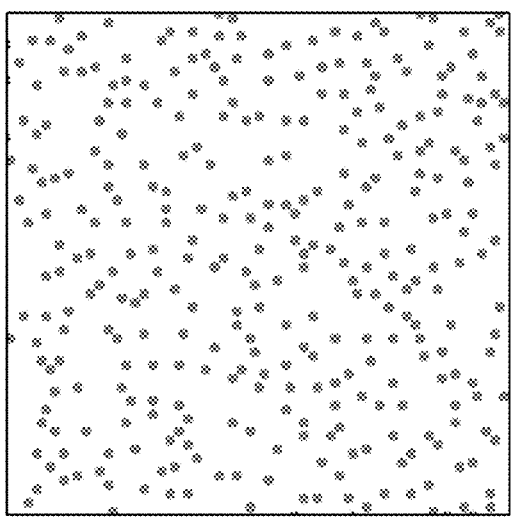
Figure 12D:
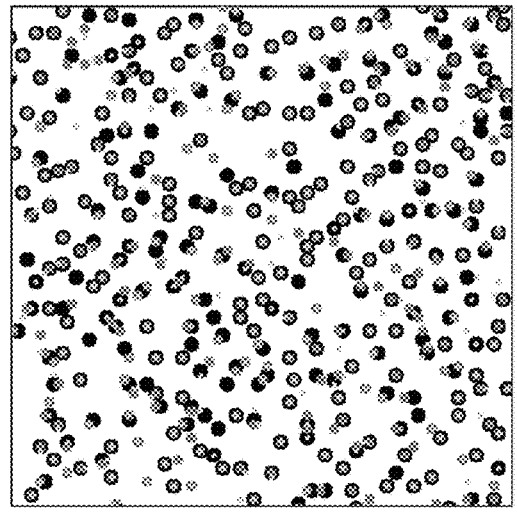
FIG. 12D shows their superposition.
Figure 12C:
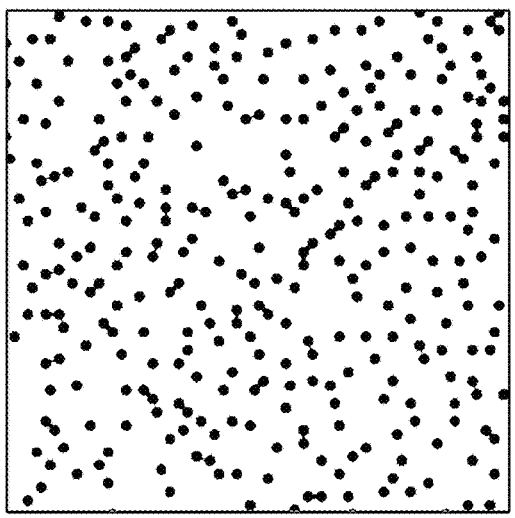

FIGS. 12A, 12B and 12C show first, second and third different sparse watermark patterns, as might be used to serialize three different items. The marks used in these patterns are here depicted with different tones of grey (light-grey, mid-grey and black, respectively), although in actual practice all marks would be rendered in the same tone (e.g., black).

FIG. 12D shows the superposition of these three watermark patterns. At some locations in the pattern, marks from two of the patterns coincide. At a subset of these locations, marks from all three of the patterns coincide. (To make such points of coincidence evident, the marks from the three patterns are shown at different sizes.)

Figure 13:
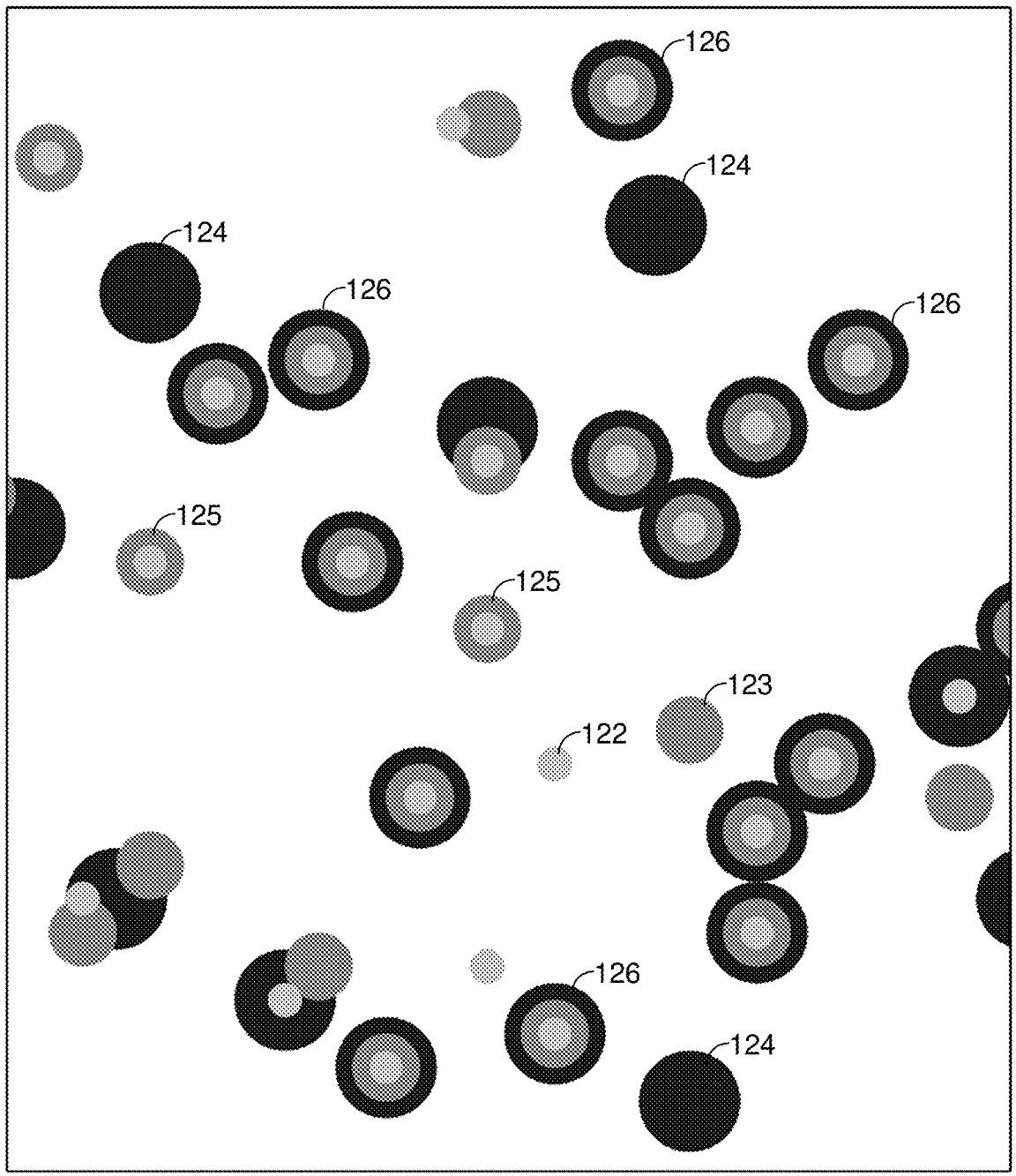
FIG. 13 is an enlarged counterpart to FIG. 12D, showing the positions of dots in differently-serialized watermark patterns.

An enlarged excerpt from FIG. 12D is presented in FIG. 13. At some locations 122, the light-grey marks from the first pattern (FIG. 12A) are found in isolation. Likewise, at some locations 123, 124 the mid-grey marks from the second pattern (FIG. 12B), and the black marks from the third pattern (FIG. 12C), are found in isolation. At some locations 125, marks from two of the patterns coincide. And at some locations 126, marks from all of the patterns coincide.

Economy in data storage and transmission is gained by not repeatedly specifying, for each different pattern block, the locations where marks 126 always occur. Such information can be stored (transmitted) once, and then re-used in different pattern blocks. (With some adjustment, the same strategy can be used for locations where marks usually, instead of always, occur.)

Figure 14A:
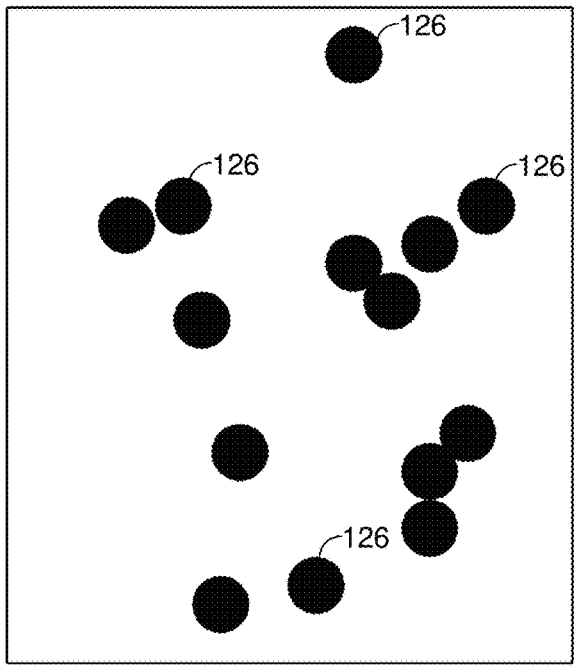
FIGS. 14A and 14B show the decomposition of the dots of FIG. 12C into a set of static dots and a set of variable dots.
Figure 14B:
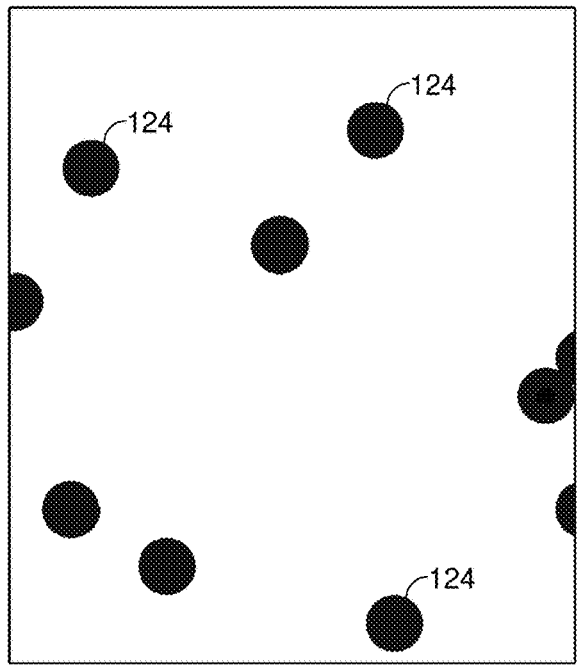
Figure 14C:
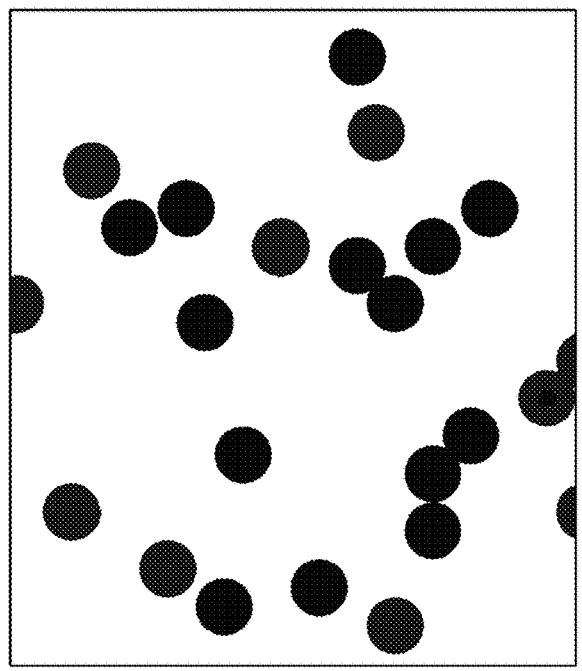
FIG. 14C shows their superposition.

Such splitting of a watermark pattern into consistent (fixed, or nearly so) and variable portions is illustrated in FIGS. 14A-14C. FIG. 14A shows the mark locations 126 (from FIG. 13) at which marks always occur. That is, these are the locations 126 where marks from all three patterns spatially coincide, i.e., the fixed locations. FIG. 14B shows the mark locations 124 from the third pattern (FIG. 12C) that are not among the fixed locations. When these two patterns are superimposed, as in FIG. 14C, the third pattern of FIG. 14C results.

There are various techniques that can be applied to find locations of consistent marks among multiple patterns. One is to take a 2D binary representation of a first pattern (e.g., with a "1" at locations where a mark is present and a "0" at other locations), and logically AND it with such a 2D binary representation of a second pattern. The 2D result of such operation is then ANDed with such a 2D binary representation of a third pattern, and that result is ANDed with such a 2D binary representation of a fourth pattern, and so on. The result of these ANDing operations indicates the locations in the 2D watermarks patterns that are always marked.

A similar technique can be performed on 1D data, by representing each pattern as a single long row of data, composed of the first row of pattern data, immediately followed by the second row of pattern data, immediately followed by the third row of pattern data, etc. (This may be termed a "row-sequential" form of pattern representation.) These 1D data structures for different patterns are then ANDed together to find locations that are always marked.

The reason that some locations are always marked is the earlier-discussed reference signal component of the watermark signal block. As noted, the reference signal component is commonly expressed strongly in the watermark signal, and its extrema dominate the composite reference-plus-payload signal. And, as noted, some methods of generating sparse marks start by identifying the darkest locations in the reference signal and placing marks there—irrespective of the spatially-corresponding value of the payload signal.

Figure 15:
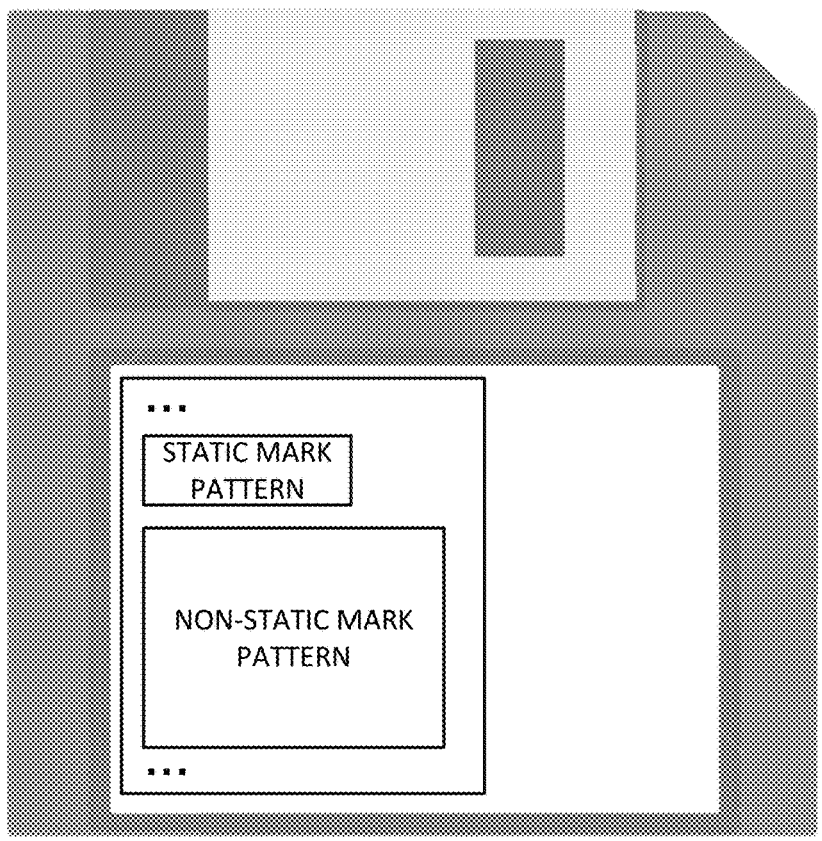
FIGS. 15 and 16 illustrate the storage of static and non-static watermark pattern data on a storage medium and in a data structure.
Figure 16:
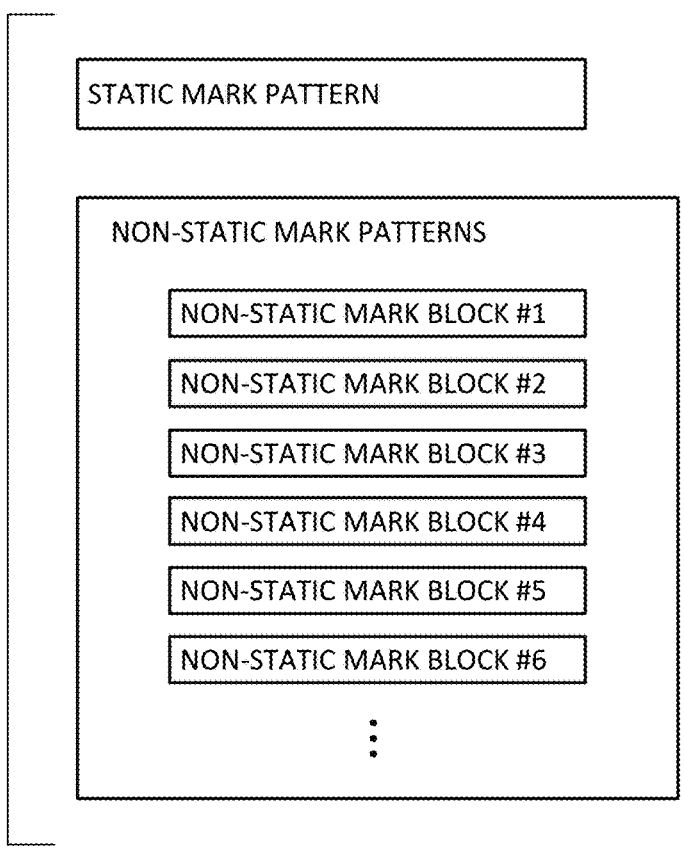

After such fixed mark locations are identified (e.g., as in FIG. 14A), such location data can be stored in one data structure (e.g., a BMP image file with marks at the fixed locations) in a computer readable medium. One or more other data structures can then store location data for the variable mark locations. Such arrangement is shown in FIGS. 15 and 16.

Figure 17:
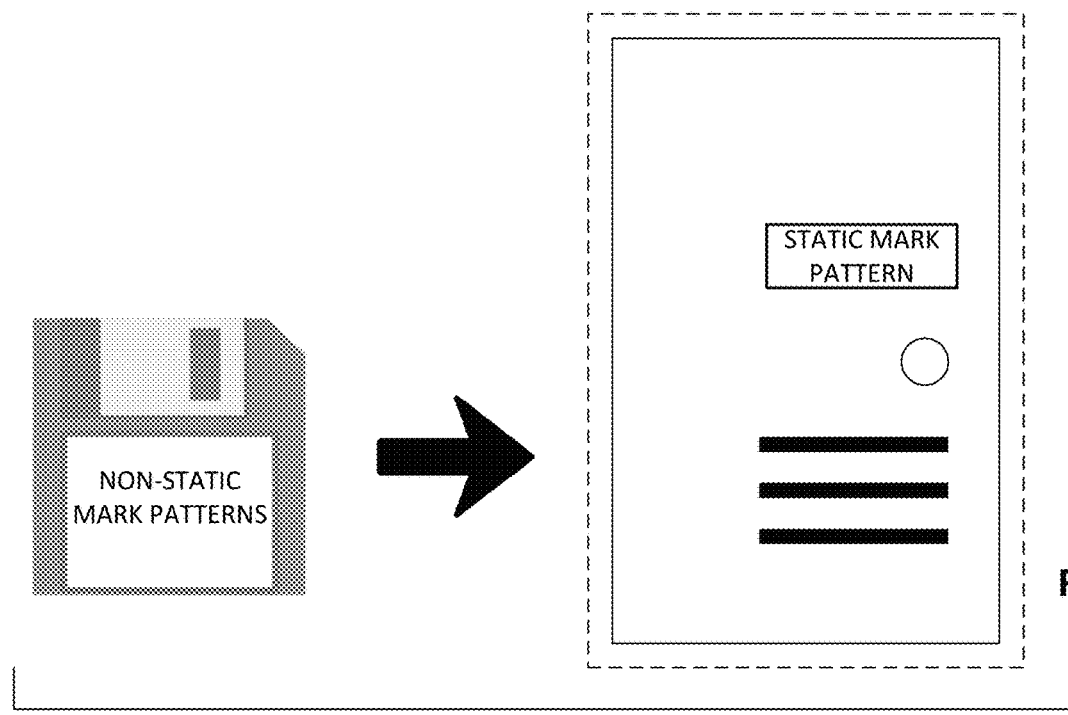
FIG. 17 shows that sometimes static pattern data does not need to be stored or conveyed with variable pattern data; it may be fixedly resident on a server computer.

Typically, the storage medium is a disk or semiconductor memory, and both the static and variable marks' locations are stored in the same storage medium. However, this is not required. For example, if a printing company commonly prints items with watermark patterns, then the company may have a record of the static mark locations, e.g., stored in a server computer. In such cases, the customer who provides print jobs to the printing company need not provide the static mark location data. It can provide a storage medium to the printer (or electronically send data to the printer) with one or more data structures defining the variable mark locations for different items, but omitting the static mark locations. Such arrangement is shown in FIG. 17.

Figure 18:
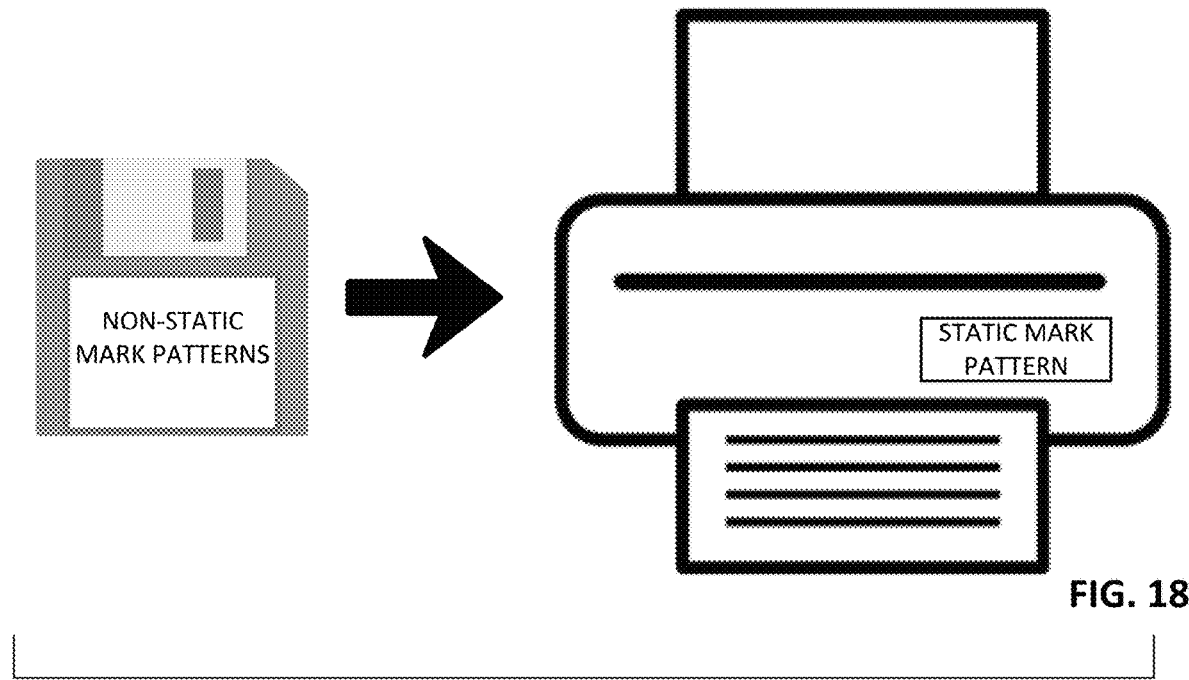
FIG. 18 is like FIG. 17, but showing that the static pattern data may be fixedly resident in a printing system.

Similarly, the printing apparatus can itself include fixed storage (e.g., ROM) in which static mark location data is stored. This can be a RIP processing system (engine) associated with the press. Again, the customer-provided data includes only the variable mark location information. The static mark location information is already known to the printing apparatus. Such arrangement in shown in FIG. 18.

In all such instances, a programmed processing system, such as a RIP engine, or a program that interprets PDF file instructions, takes the static mark pattern that is common to all watermark blocks, and uses it in conjunction with the variable mark pattern for each individual watermark pattern, to yield unique composite patterns that include both parts.

Sometimes the "static" pattern data can identify locations other than those that are always marked. For example, the static pattern data can additionally identify block locations that are usually marked. Such usual marking of certain locations can be due, for example, to the nature of the payload data. Such locations can be determined empirically by examining the variable mark location data for some number (e.g., 20 or 100) of pattern blocks, and identifying those locations those that are found to be marked an improbable number of times (e.g., beyond two or three standard deviations of what is statistically expected). Such locations can then be grouped with the truly fixed locations, and identified in a data structure that is stored/transmitted only once. Together, such data can be regarded as "mostly static pattern data" or "reference pattern data."

Figure 19:
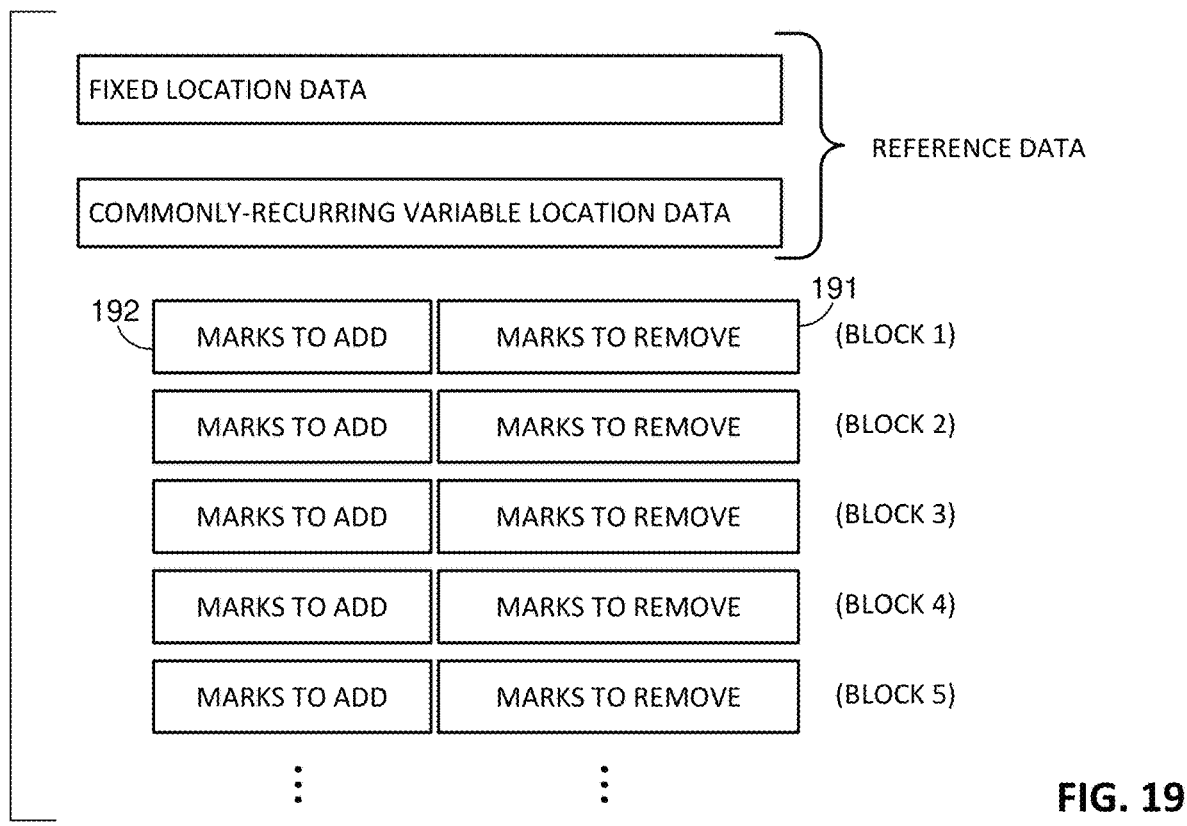
FIG. 19 shows a watermark data structure including both reference data, and add/subtract data.

In such case, the variable data serves not just to specify locations where marks should be added to the composite pattern, but also sometimes to specify locations where marks that are not found in a particular pattern should be removed. In such case the variable data may be regarded as having two components. An "add" component specifies block locations at which marks should be added, and a "subtract" component specifies block locations at which marks (e.g., specified in the reference pattern data) should be removed. Such arrangement is illustrated by FIG. 19.

Again, the processor that generates watermark blocks for printing responds to the foregoing specification of mark locations to compose an image block having marks at all of the reference pattern locations—except any locations identified in an exclusion list 191 for that block—together with marks at all of the variable data locations 192 for that block.

Figure 20:
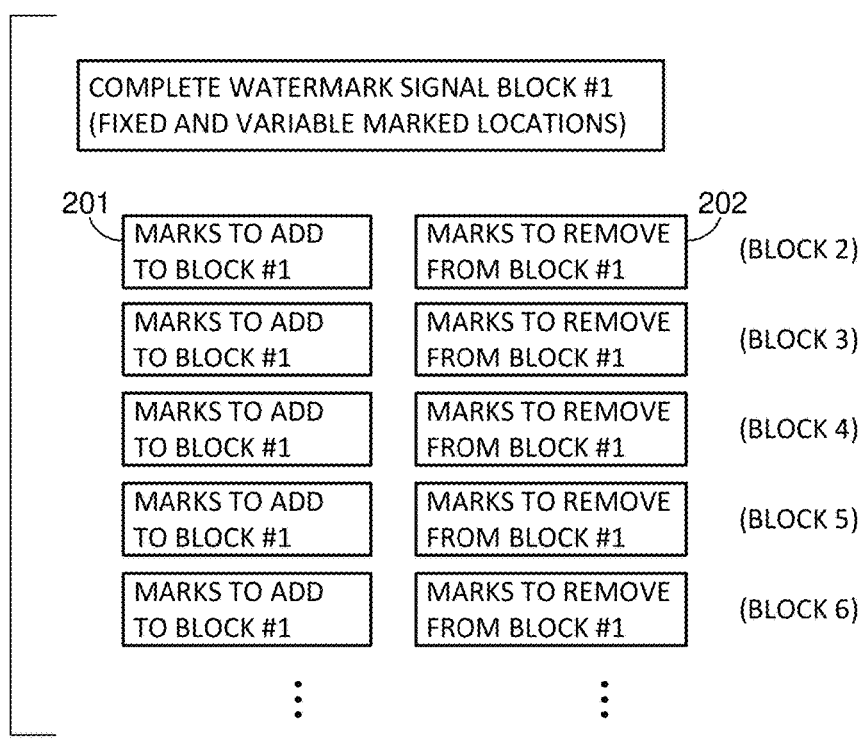
FIG. 20 shows a watermark data structure including a complete watermark signal block, together with add/subtract data.

FIG. 20 shows a further extension of this concept. Instead of storing/sending reference pattern data once, the FIG. 20 arrangement uses the complete pattern data for a particular watermark block (e.g., block #1) as the reference pattern data, and then for each subsequent block stores/sends difference data. The difference data is of two types—adds and removes. A first, add, list 201 specifies block locations that should be marked in addition to those specified in the block #1 data. A second, remove, list 202 specifies block locations that are marked in block #1 but which should not be marked for block #2. Subsequent blocks are similarly defined in terms of their differences from block #1.

A still-further arrangement is similar. However, instead of defining every block in terms of its differences from block #1, each block is defined in terms of its differences from the immediately-preceding block. That is, the reference pattern block (by reference to which changes are made) is updated to match an actual block composed by a previous cycle of the process.

We now turn to representation of the just-discussed data.

Image data—including watermark patterns—are conventionally stored in an image format such as BMP. In BMP, each row of image data takes the form of a sequence of values, expressing the value of each pixel. Multiple rows are expressed consecutively, depending on the vertical dimension of the image. Each row has the same format and length.

It is possible to use run length encoding with BMP image data. Run length encoding (RLE) expresses a string of data in term of its repetitions, and has been used widely with FAX data. FAX data is bitonal, and is characterized—row-wise—by strings of white pixels interspersed with strings of black pixels. In one FAX system, each row is replaced by a series of numbers specifying how many pixels are of the same color, starting with white. To illustrate, here is the start of a row of bitonal FAX data, with 0 representing white pixels and 1 representing black pixels:

110001111100111

This string can be represented by the sequence:

0,2,3,5,2,3

The end of each row can be denoted by a different symbol, such as "A," to permit sync recovery in case of data loss.

Sometime run length encoding is used in conjunction with Huffman coding. Huffman coding is a compression method in which different symbols are assigned to represent different data values, with the shortest symbols being assigned to represent the most common data values (and the longest symbols being assigned to represent the most uncommon data values).

Other compression schemes for bitonal data are also known, e.g., CCITT v4 (sometimes termed CCITT FAX), and JBIG2. Wikipedia articles for these subjects, as well as BMP, RLE and Huffman coding, are attached as appendices to priority application 63/323,833 and form part of the present specification.

Any of these technologies can be utilized in embodiments of the present technology. However, other arrangements are sometimes still more efficient.

In many applications the component marks comprising a watermark block are all the same size, e.g., a single pixel, or a 2×2 or 3×3 block of pixels. In such case, the representation need not specify how many dark pixels in a row are marked (assuming the watermark comprises dark marks on a light background). Since all of the marks are identical, only one anchor point for each mark needs to be specified, such as the upper left corner location, or center location, of the mark. For isolated pixel marks, this reduces to the location of the single pixel. The encoded representation can then simply indicate the distance between the dark pixels in a serialized representation of the image.

Figure 22:
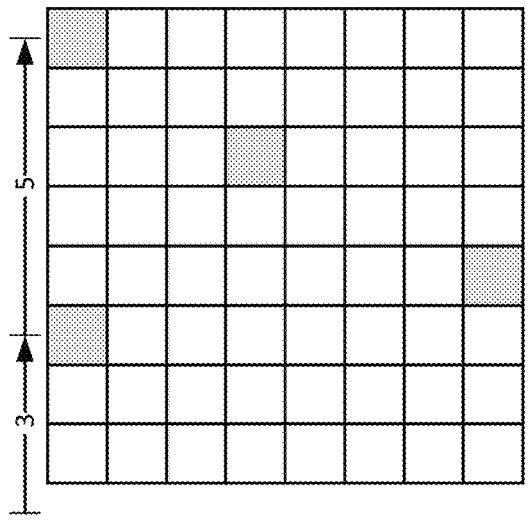
FIG. 22 shows an illustrative variable data pattern.
Figure 21:
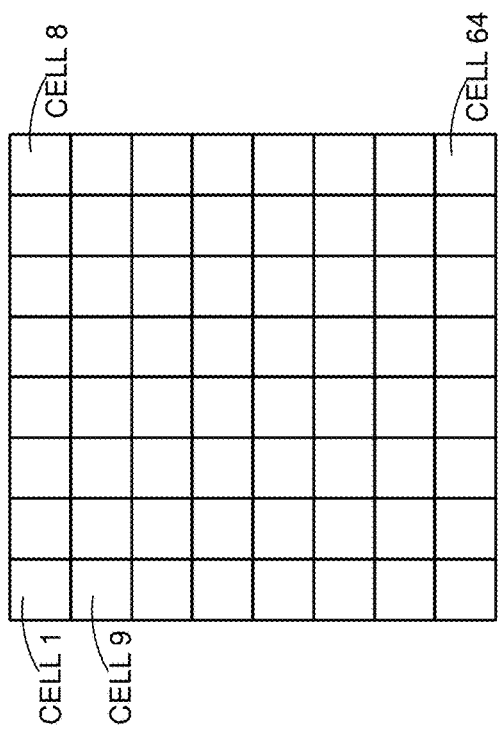
FIG. 21 shows cell numbering of an exemplary watermark block.

FIG. 21 shows an empty watermark signal block with candidate mark locations (cells) within the block identified by consecutive numbers. In this case the block is of size 8×8, so the cells are numbered from 1 to 64. (More typically a watermark block is larger, e.g., 64, 96, 128 or more elements on a side.) FIG. 22 shows the variable part of a watermark—with marks denoted by darkening of certain cells.

In one arrangement, the pattern of marks in FIG. 22 is expressed simply as the difference between successive ones of the marked cells. Such a representation is shown by the sequence of FIG. 23. In another arrangement, a series of integers expresses the number of white locations between successive marks, as shown in FIG. 24. In still another arrangement, the cell numbers of each anchor location are identified, as shown in FIG. 25.

Typically, each of these numbers is represented in binary form. The bit depth "N" used for such representation depends on the largest value expected to be encoded. This can vary from application to application, e.g., depending on the sparseness of the mark. With less-sparse watermarks, the variable data portion may comprise 1000 dark marks. If the block size is 128×128 (16,384 blocks), then the average space between marks may be around 16. An N=6 bit representation for each number in the sequence may then be adequate—permitting numbers up to 64 to be represented. If, on the other hand, the watermark is very sparse, then the variable data part may comprise merely dozens of marks. In this case the sequence can include larger numbers. In such case the numbers may be represented with larger bit lengths—in some instances up to N=12 or N=14 bits.

Figure 26:
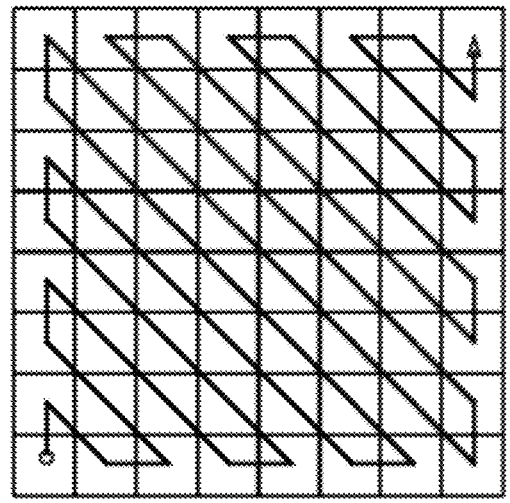
FIG. 26 shows a diagonal path through a watermark block.

A variety of such representations can be devised. Some are structured in row-sequential form, as above. Others are structured in column form. Still others are structured in diagonal (zig zag) path form, such as is shown in FIG. 26. Etc. Such representations are characterized by having one datum per dark mark and not two per dark mark (e.g., as in run length encoding, where each dark run is specified by the number of white cells preceding and the number of dark cells in the run).

Various strategies can be employed to deal with the rare circumstance in which the selected binary bit length is inadequate to represent one of the numbers in the sequence (which may be termed a binary overflow condition). One such strategy is to represent a large number in the sequence as two successive numbers of half its value. This can put a mark at an unintended location in the watermark block, but this is typically of no consequence, due to the robust error correction encoding employed by preferred watermark technology. Alternatively, in reconstructing a pixel-mapped counterpart to the variable part, the processing system can look for two equal values (or consecutive values) at adjoining locations in the sequence. If their binary representations start with a "1" bit (i.e., a value in the upper half of the range that the binary string can represent), the system can understand this to mean a single value equal to the sum of the two values. Etc.

Synchronization codes can be included in the sequences to denote the ends of rows, or of every P rows (e.g., P=8) rows, but this is not generally necessary. More typically, a CRC code is employed to ensure the integrity of a data sequence representing an entire block or stream of variable watermark data.

The value 0 does not appear in any of the sequences of FIGS. 23-25. This value can be used as a synchronization (sentinel) code if desired. The values 1 and 2 and other low values may also not appear, if a "keep-out" strategy is employed to avoid clumping of marks and assure a minimum mark spacing. These values, too, can be given special meanings—some of which can be employed to cope with the binary overflow conditions noted above.

In an illustrative embodiment, the sequence of binary numbers representing a block of variable watermark data is packed into a bit string, and is padded to reach a length that is an integer multiple of 8- or 32-bits. This data can then be put into a wrapper that includes administrative (header) data, e.g., specifying the block size (e.g., 256×256 pixels), the definition of each mark (e.g., a square of 2×2 pixels), the color of the marks (if not black), together with the file name and creation date, and other such information as is conventional in image file formats.

In some embodiments, padded sequences for multiple different blocks of variable watermark pattern data are included in a single file structure, accompanied by a common set of administrative data. This administrative data can include a datum indicating the number of such blocks of watermark data included in the file. A further sequence of binary numbers representing the block of static mark locations can also be included in the sequence. The data structure can be a PDF content stream.

Figure 27:
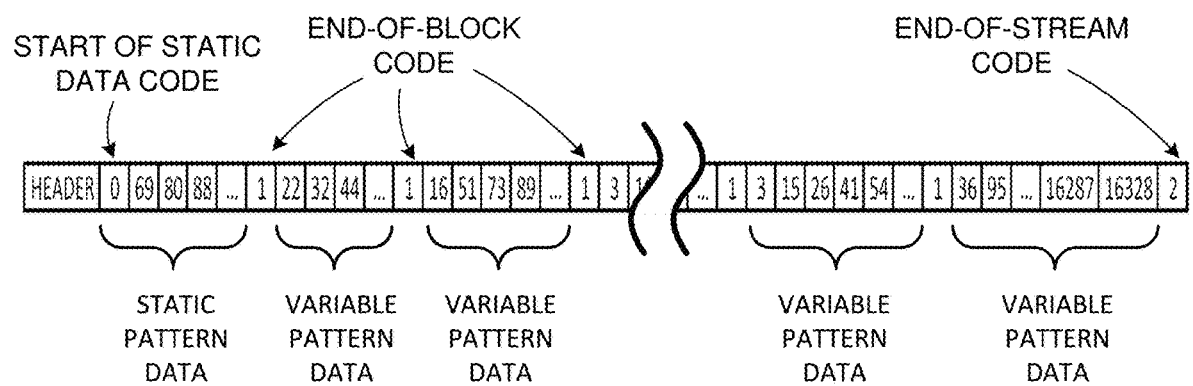
FIG. 27 shows a watermark data structure including header data, a set of static pattern data, and a series of unique sets of variable pattern data.

FIG. 27 shows a content stream incorporating certain of the aspects detailed above. It starts with the header data. A code follows the header data indicating that the data which follows defines the static mark locations for the watermark pattern. This code can be, e.g., the binary number "0," expressed as N bits. Then follows watermark pattern data, starting with a sequence of binary numbers (each comprising N bits) specifying the static mark locations. These locations can be specified in one of the compressed manners detailed above, e.g., as shown in FIG. 23. And end-of-block code (e.g., the binary number "1") then follows. It is followed immediately by a next sequence of binary numbers. This sequence identifies the variable data mark locations for the first watermark block. This sequence may be longer or shorter than the one that preceded it (it is typically shorter, as there are often fewer variable mark locations than static mark locations). And end-of-block code concludes this data, and a further sequence of binary data follows—identifying the variable data mark locations for the second watermark block. The data structure continues in this fashion—the variable data mark locations for each block being followed by the variable data mark locations for the next block. After hundreds (or hundreds of thousands) of blocks have been so-specified, an end-of-stream code (e.g., an N-bit binary "2") follows.

A processing system recovers the original watermark pattern blocks by a corresponding process. After finding the "0" code denoting the start of the static mark data, the system reads binary data, as N-bit symbols, until the binary value "1," signifying end-of-block is encountered. These first data indicate the static (reference) watermark pattern mark locations. The decoding system continues past this "1" code and reads a further string of binary numbers, until the next end-of-block code "1" is encountered. These data specify the variable mark locations for the first watermark block. The system composes an image data structure having marks at both the locations indicated by the static data, and the locations indicated by the first variable data. The image data structure thereby composed comprises the complete first watermark pattern block.

Figure 28:
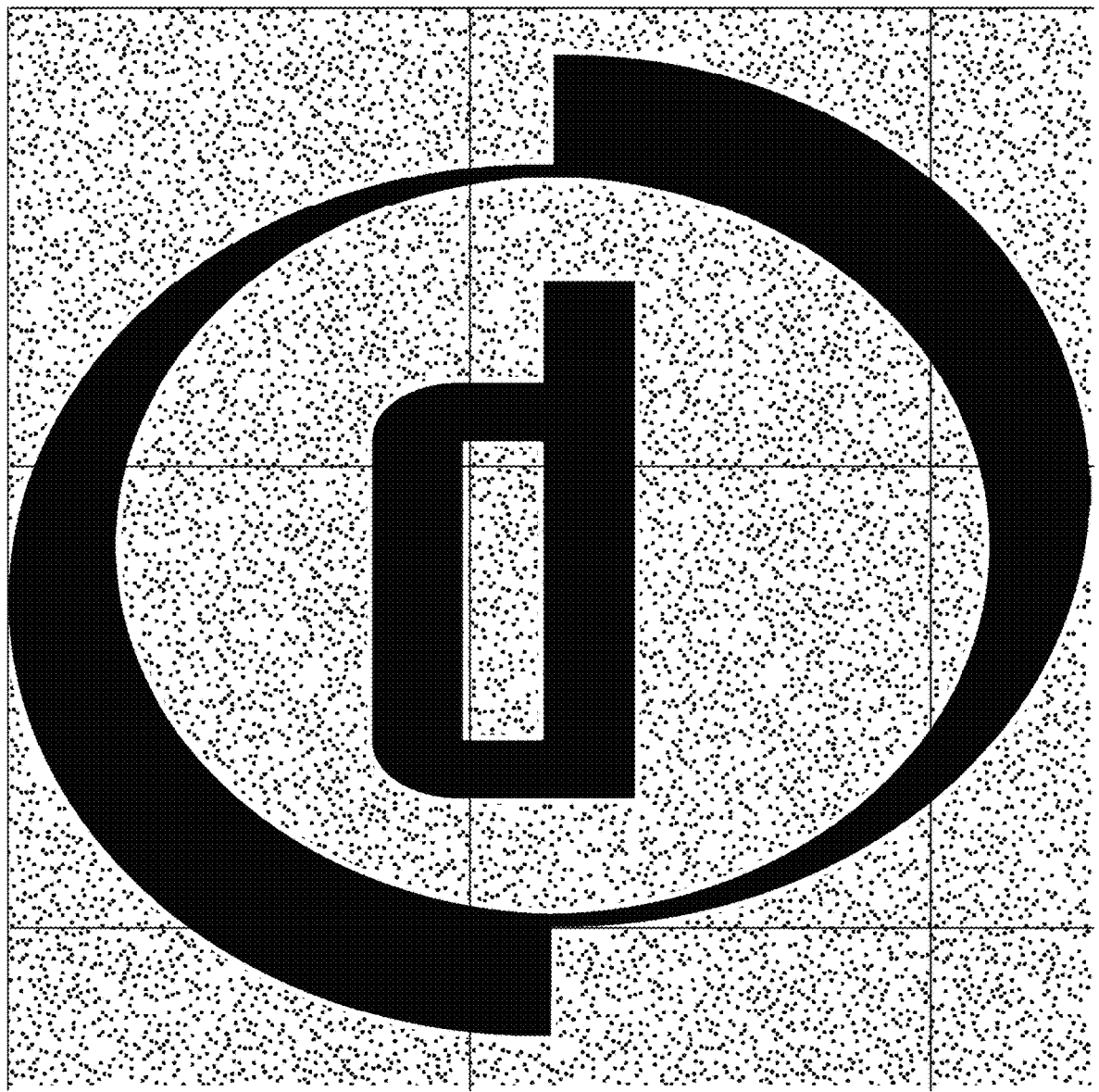
FIG. 28 shows a corporate logo with a background of tiled watermark blocks.

To compose a label, the system tiles this complete first watermark pattern block across a virtual canvas—repeating as necessary, vertically and horizontally, to span the available area. An example is shown in FIG. 28, where a label comprises a corporate logo on a background field of watermark pattern. (The label is shown in magnified form to reveal detail; its actual size is two inches on a side. Also, the marks in this example are shown at many times their typical scale, to aid visibility.) The thin lines in FIG. 28 show the boundaries of the tiled watermark block. As can be seen, the watermark pattern block is tiled a bit more than twice in the horizontal direction and a bit more than twice in the vertical direction. A thin, un-patterned keep-out region surrounds the logo graphic to keep its appearance sharp.

Figure 29:
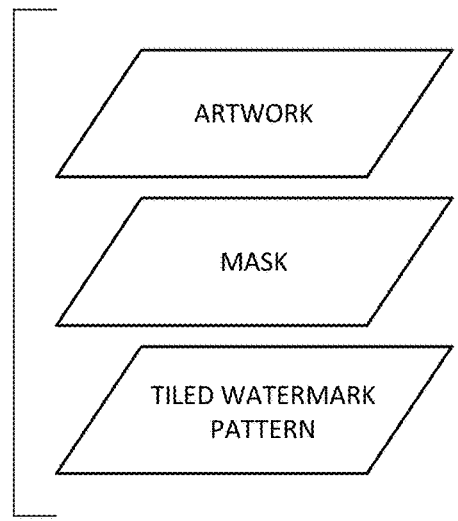

In many applications, the tiled watermark pattern and the logo graphic are defined by different layers in an image processing system data structure. The system composites, or blends, the layers together for rendering. In this example (FIG. 29), there are actually three layers: the third is a mask layer that defines the guard band around the graphic. The layers are rendered with the tiled watermark pattern as the bottom background layer, the mask layer as the intermediate layer, and the logo graphic (artwork) as the top layer. A rendering system (RIP engine) then controls a printer to form a physical counterpart of the layered imagery on a print medium, yielding the first printed label.

Returning to the stream data of FIG. 27, the system resumes by reading binary data from the last-mentioned end-of-block code "1" and continues reading until the next end-of-block code "1." These data are the variable mark locations for the second watermark block. Again, the system composes an image data structure having marks at both the locations indicated by the static data, and the locations indicated by the just-read second variable data. The image data structure thereby composed comprises the second watermark block.

Again, this second watermark pattern block is tiled to create a background layer for a second label. This background layer is swapped-in for the previous background layer. The intermediate mask layer and the top logo layer are unchanged. Again, a rendering system controls a printer to form a physical counterpart of the layered imagery on a print medium, yielding the second printed label.

The system continues in this fashion, reading binary data from the stream of FIG. 27 until the next end-of-block code "1" is encountered. A watermark pattern is then generated based on the just-read data and the earlier-read static data. A tiled watermark pattern layer is created and swapped into the layered imagery as the background layer, and the label is printed. This process continues, generating additional uniquely-watermarked labels, until an end-of-stream marker is encountered in the binary data—here a binary "2."

Figure 30:
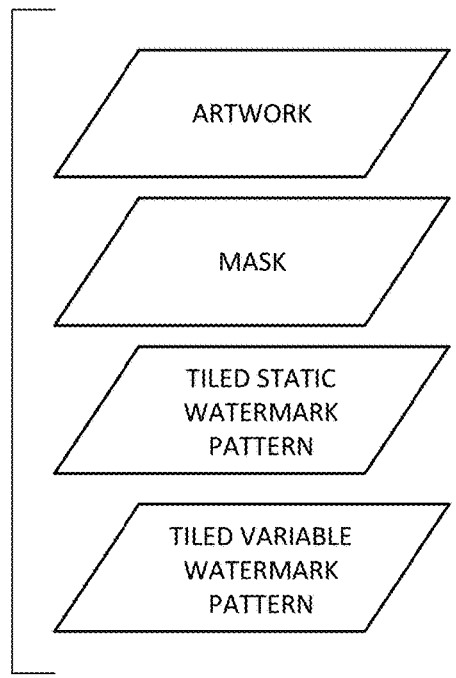

In a variant arrangement, shown in FIG. 30, there are not three layers but four. In this arrangement, the fixed and variable parts of each watermark block are not first combined into a single complete watermark block. Instead, these parts are kept separate. The fixed part of the watermark pattern is tiled as one layer in the data structure, and the variable part of the watermark pattern is tiled as another. As in the earlier arrangement, each time the system parses a new block of variable pattern data from the content stream, it swaps new watermark data into the layered data structure. In this case, however, it only swaps-in the new variable watermark data; the static watermark data remains unchanged.

As indicted earlier, multiple labels may be printed on a common sheet. In such case, the foregoing process is adapted to compose a larger canvas with multiple labels, each with a different watermark pattern as its tiled background. In the case of rolled media, the system can compose a multi-label canvas spanning a first increment of roll (e.g., three labels across by ten labels long) and send it to print. While it is being printed, the system can compose such a canvas spanning the next increment of roll, etc.

Printers commonly work from PDF files. The portable document format (PDF) is an ISO-standardized format for representing text and images that was originally developed by Adobe, Inc. There are several versions; ISO-32000-1: 2008 is exemplary. Based on the PostScript language, each PDF document can convey text, fonts, vector graphics, raster images, and other information needed to render it.

Since the standard is publicly available, companies other than Adobe now offer variants. There are also open-source counterparts, which can be modified to provide functionality beyond that defined by the standard.

The Acrobat and Illustrator software programs offered by Adobe support use of graphic elements expressed using BMP, RLE, CCITT FAX and JBIG2, as well as other image formats and compression schemes. However, such Adobe programs do not support user-defined compression schemes, such as the compression arrangements described above and illustrated, e.g., in FIGS. 23-25.

In a further aspect of the technology, open source portable document format software is extended to provide support for compressed data in a form optimized to represent watermark signal blocks, e.g., representing each sparse mark by a single N-bit integer datum.

Many open source PDF software packages are suitable for such extension. One is Xpdf (see the website xpdfreader dot com). Another is Poppler (see the website poppler dot freedesktop dot org). Archives for both these sites are maintained by the Internet Archive (see webarchive dot com).

Reference was made, above, to presenting the binary watermark pattern data in an image stream. This is a specified term in the ISO-3200-1:2008 portable document format specification, and refers to a data structure (object) whose data consists of a sequence of instructions describing graphical elements to be painted on a page. A "filter" is associated with each stream defined by the specification, and indicates how the data in the stream should be decoded before it is used. The ISO standard supports stream objects that represent image data using run length encoding, CCITT FAX compression, and JBIG2 compression, among others. The standard also includes corresponding filters to decode stream data expressed in these encoded manners.

Applicant's extension of Xpdf or Poppler involves, in one aspect, defining a new stream object that describes watermark pattern data by reference to its cell locations to be marked, in a compressed representation that exploits the nature of the data—as discussed herein. In another aspect, a corresponding new filter is defined to decode a stream object containing such a compressed representation of watermark pattern data. Associated software is also provided to generate the stream data to be included in such a portable document format file, i.e., performing the operations of (a) identifying mark locations that are consistent among a set of different watermark blocks, (b) identifying the variable data needed to complement the static data to permit each of multiple different watermark blocks to be created; and (c) assembling such data with header data to yield a content stream.

Such modified software may be nicknamed "Dpdf," and a file that includes such extended capabilities may be termed a "Dpdf file."

Figure 31:
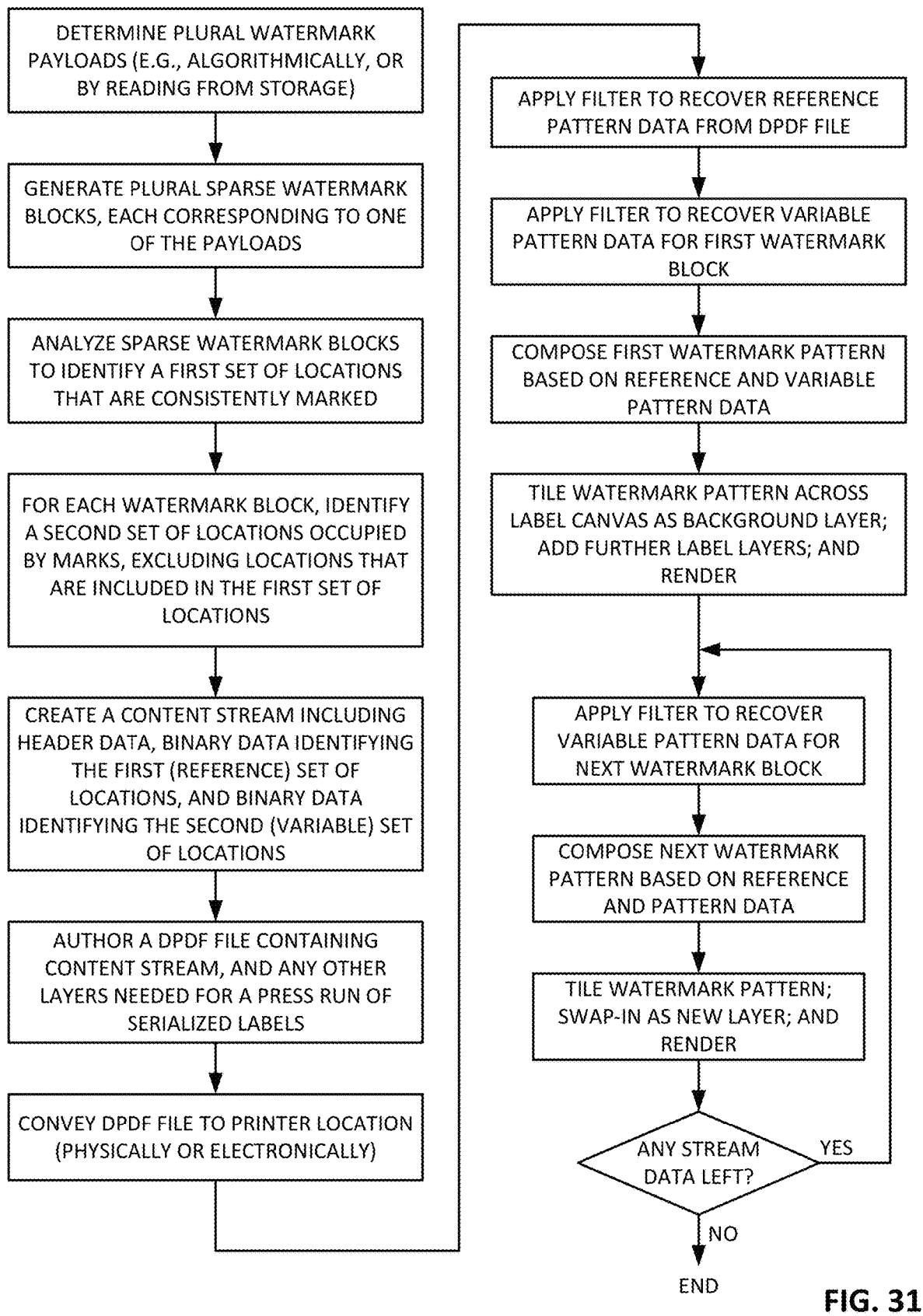
FIG. 31 is a flowchart detailing certain aspects of an exemplary method.

Certain aspects of such technology are illustrated in FIG. 31. The depicted process begins by definition of the unique watermark payloads. These are commonly defined consecutively, often starting where a previous press run stopped. For example, the payloads may be:

056101

056102

056103

...

112099

112100

A corresponding sparse watermark pattern is generated for each of these payloads. To reduce memory requirements, this may be done in batches, e.g., by generating 100 or 1000 patterns at a time.

A set of static (reference) mark locations is then determined, and multiple sets of variable locations are also determined—one for each of the generated watermark patterns. Resultant information is next written into a content stream object, and this object is then packaged in a Dpdf file together with graphics, masks, and other layers as may be appropriate to define labels of the desired design. This Dpdf file is then sent to a printer.

At the printer, the filter specific to the stream object is invoked to recover the pattern data—both the reference pattern data, and also the variable pattern data. Each set of variable pattern data is combined with the fixed pattern data to yield a complete watermark pattern signal block. This block is then tiled across a virtual canvas of a desired size, and is combined (typically overlaid) with further layers. The resulting artwork is then printed.

This process is repeated for subsequent sets of variable pattern data, with the subsequent watermark patterns swapped-in, and the corresponding labels printed.

(It will be recognized that the FIG. 31 flowchart illustrates just one of many possible processes. For example, this process does not address the above-described arrangement in which the variable mark data specifies both marks to be added and marks to be removed. The adaptation of the depicted process to cover the many alternative arrangements disclosed above is straightforward, given the teachings in this specification.)

Operating Environment

Figure 8:
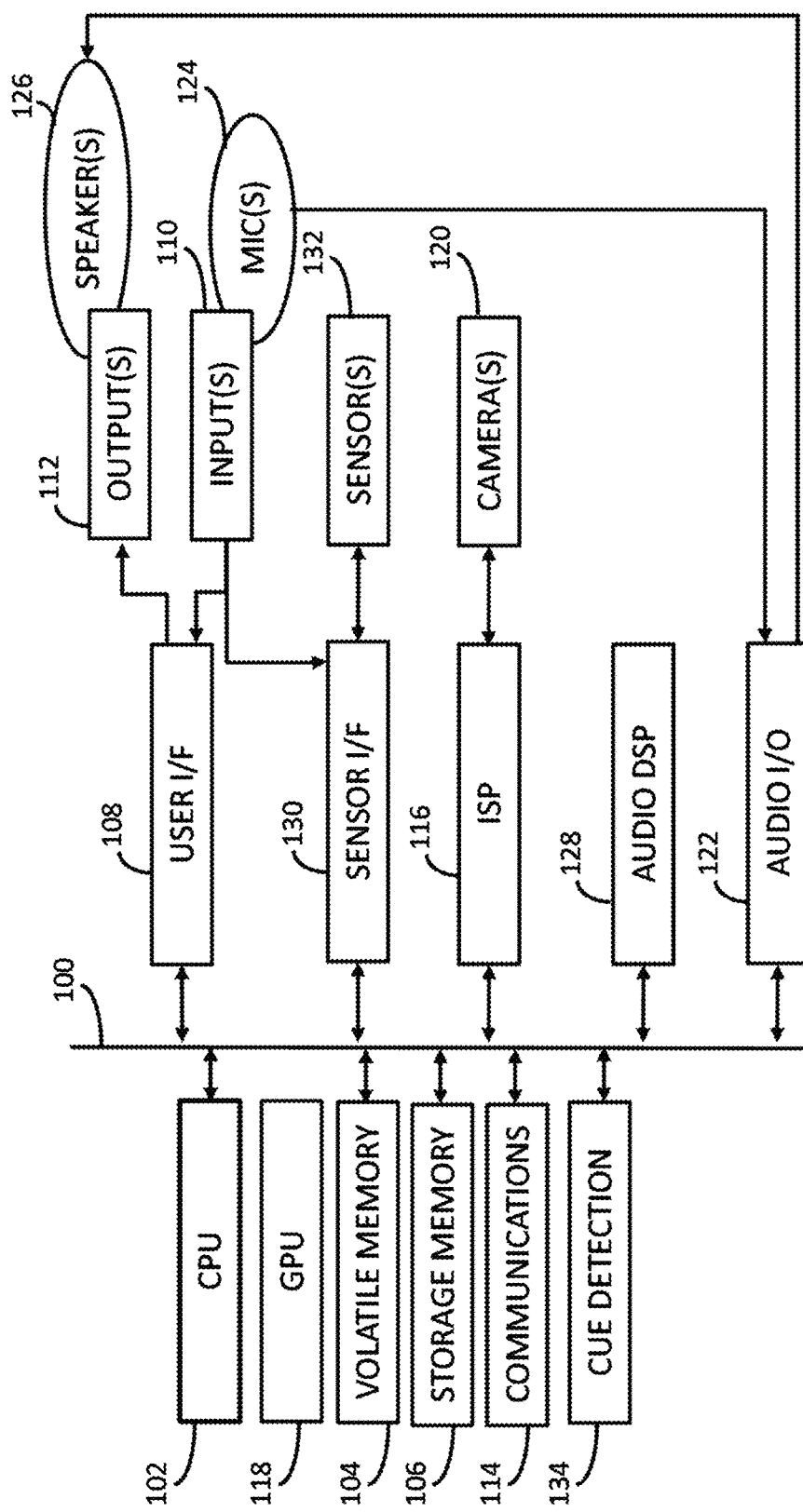
FIG. 8 illustrates an electronic device for executing image preprocessing, generating images with unique payloads, and payload decoding.

For the sake of illustration, FIG. 8 is a diagram of an electronic device in which the components of the above embodiments may be implemented. These components include the components of the DFE, press, and devices with imaging capability for capturing images of marked objects and processors to decode digital payloads from these images. It is not intended to be limiting, as the embodiments may be implemented in other device architectures or electronic circuitry.

Referring to FIG. 8, a system for an electronic device includes bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 28 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be any microprocessor, mobile application processor, etc., known in the art (e.g., a Reduced Instruction Set Computer (RISC) from ARM Limited, the Krait CPU product-family, any X86-based microprocessor available from the Intel Corporation including those in the Pentium, Xeon, Itanium, Celeron, Atom, Core i-series product families, etc.). The CPU 102 runs an operating system of the electronic device, runs application programs (e.g., mobile apps such as those available through application distribution platforms such as the Apple App Store, Google Play, etc.) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device.

The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104.

The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the present invention, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof.

Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like. Application software typically includes any application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, etc. A software component can also include any other data or parameter to be provided to application software, a web application, or the like or any combination thereof. Examples of data files include image files, text files, audio files, video files, haptic signature files, and the like.

Also connected to the bus 100 is a user interface module 108. The user interface module 108 is configured to facilitate user control of the electronic device. Thus the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user's control of the electronic device, or any other information related to an operation being performed by the electronic device or function otherwise supported by the electronic device. Thus the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, a buzzer, a haptic actuator, a loud speaker, or the like or any combination thereof.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, or printer) may be a physically separate device that is communicatively coupled to the electronic device (e.g., via a communications module 114). A printer encompasses many different devices for applying images, including our reference and payload signals, to objects, such as 2D and 3D printers, etching, engraving, embossing, laser marking, etc., in additional to the digital press technology described above.

Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. General functions typically performed by the ISP 116 can include Bayer transformation, demosaicing, noise reduction, image sharpening, or the like or any combination thereof. The GPU 118 can be configured to process the image data generated by the ISP 116, thereby generating processed image data. General functions typically performed by the GPU 118 include compressing image data (e.g., into a JPEG format, an MPEG format, or the like or any combination thereof), creating lighting effects, rendering 3D graphics, texture mapping, calculating geometric transformations (e.g., rotation, translation, etc.) into different coordinate systems, etc. and send the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display, printer or speaker.

Also coupled the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal(s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously).

The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or any combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described below). In one embodiment, the audio DSP 128 includes a core processor (e.g., an ARM® AudioDE™ processor, a Hexagon processor (e.g., QDSP6V5A)), as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or any combination thereof. Optionally, the communications module 114 includes cache or other local memory device (e.g., volatile memory, non-volatile memory or a combination thereof), DMA channels, one or more input buffers, one or more output buffers, or the like or any combination thereof. In one embodiment, the communications module 114 includes a baseband processor (e.g., that performs signal processing and implements real-time radio transmission operations for the electronic device).

Also connected to the bus 100 is a sensor interface module 130 communicatively coupled to one or more sensors 132. A sensor 132 can, for example, include an accelerometer (e.g., for sensing acceleration, orientation, vibration, etc.), a magnetometer (e.g., for sensing the direction of a magnetic field), a gyroscope (e.g., for tracking rotation or twist), a barometer (e.g., for sensing altitude), a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 28, any camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110. The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

Notwithstanding any specific discussion of the embodiments set forth herein, the term "module" may refer to software, firmware or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as computer processors comprising one or more individual instruction processing cores, state machine circuitry, or firmware that stores instructions executed by programmable circuitry.

Implementation can additionally, or alternatively, employ special purpose electronic circuitry that has been custom-designed and manufactured to perform some or all of the component acts, as an application specific integrated circuit (ASIC). To realize such an implementation, the relevant module(s) (e.g., encoding and decoding of differential modulation within host image or audio content) are first implemented using a general purpose computer, using software such as Matlab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Implementation can additionally, or alternatively, employ electronic circuitry in the form of a Field-Programmable Gate Array (FPGA). The FPGA configuration is specified using a hardware description language (HDL), similar to that used for an ASIC.

CONCLUDING REMARKS

Having described and illustrated the principles of the technology with reference to specific implementations, it will be recognized that the technology can be implemented in many other, different, forms.

For example, while the specification has focused on applications in which the variable data patterns are formed by printing, in other applications such patterns can be formed otherwise—such as by laser texturing. (See, e.g., our patent publication 20210390358.)

Although printing with dark ink on a light substrate is most common, a 2D code pattern can be printed in many other forms. One is by printing with a nearly-white ink on a light substrate. This is detailed, e.g., in our patent 10,580, 103. Another is by pattern printing with a clear varnish. This is detailed, e.g., in our pending application 63/197,298, filed Jun. 4, 2021. In these and other instances, the pattern can be defined by printed dots, or by a pattern of unprinted voids left within a flood of ink.

Similarly, while an illustrative embodiment describes a content stream in which the static mark locations are expressed just once, immediately-following header data, it will be recognized that such data can be placed elsewhere in a file. Moreover, the static data may be expressed repeatedly in the file—such as after every 100 sets of variable data.

In other embodiments the static mark locations can be specified by a content stream distinct from the content stream object containing the variable mark locations.

In still other embodiments, the content stream may not literally define static mark locations. Rather, it may convey a batch identifier that is used to dynamically retrieve the actual static mark locations from an external source (e.g., a local or more database) at run-time.

Reference was made to embodiments in which marks are both added and removed. The removal of a mark, e.g., identified in a block of static watermark pattern data, can be accomplished in various ways. One is by using masking, or clipping, functions of the portable document format (and other vector graphics document formats). Another is by use of a top layer that includes a white mark that overlays a position where a black mark in the watermark pattern layer is to be removed (with the rest of the top layer being transparent).

Although certain embodiments describe layered artwork as including a watermark pattern as the bottom layer, this is not essential. In different arrangements a watermark layer can be placed at other positions.

Similarly, while various embodiments describe combining static and variable mark location data to generate a single watermark pattern block, in alternative embodiments the static and variable data can be kept separate, in different layers. A pattern having marks as defined by the static data can comprise one layer of an artwork, and a second pattern having marks as defined by the variable data can comprise one or more different layers of the artwork. (At rendering time, all artwork layers are essentially flattened into one to yield the final printed output.)

As indicated, the illustrated compression schemes and data formats are exemplary only. Many other such arrangements fall within the more general teachings provided above.

It will be understood that "static" and "fixed" are used in a loose sense, as they may specify locations that are not marked in every watermark pattern. Thus, such terms include what the specification references above as, e.g., "consistent," "mostly-fixed" and "pseudo-static."

Although aspects of the specification focus on sparse, bitonal digital watermark patterns, those teachings likewise apply to other forms of watermarks. These include watermark signals in which information is conveyed by variations in luminance (so-called "luma" watermarks) and watermark signals in which information is conveyed by variations in chrominance (so-called "chroma" watermarks), e.g., as detailed in patent documents incorporated by reference. Likewise, sparse patterns can be rendered as variations in substrate translucency. For example, paper can be impressed with a pattern of marks (e.g., by inkless letterpress), producing an effect that can be sensed from the front of the medium when illumination is present at the back.

Similarly, other 2D code symbologies include elements that are common even with different payloads. (An example is QR codes, with their synchronization marks.) The detailed technology can be used with such other codes.

In some embodiments, the serialized payloads are not applied to different items. Instead, a series of serialized payloads are applied to a single item. For example, a packing/shipping tape used to seal a cardboard carton may include a series of watermark blocks, with different payloads. If later inspection of the tape on the carton reveals that the series of payloads does not follow an expected sequence, then this can indicate possible tampering with the carton. The above-detailed technology can be employed to reduce the size of files needed to print such tape, e.g., by conveying static information only once. (For further information on detecting carton tampering using watermarked tape, see our pending applications 63/256,387, filed Oct. 15, 2021, and Ser. No. 16/937,514, filed Jul. 23, 2020, U.S. Pat. No. 11,636,565.)

To provide a comprehensive disclosure without unduly lengthening the specification, applicant incorporates by reference the documents referenced above.

For purposes of this patent application, a watermark is a 2D code produced through a process that represents a message of N symbols using K output symbols, where the ratio N/K is less than 0.2. (In convolutional coding terms, this is the base rate, where smaller rates indicate greater redundancy and thus greater robustness in conveying information through noisy "channels"). In preferred embodiments the ratio N/K is 0.1 or less. Due to the small base rate, a payload can be decoded from a watermark even if half of more (commonly three-quarters or more) or the code is missing.

In an exemplary embodiment, 47 payload bits are concatenated with 24 CRC bits, and these 71 bits ("N") are convolutionally encoded at a base rate of $\frac{1}{13}$ to yield 924 bits ("K"). A further 100 bits of version data are appended to indicate version information, yielding 1024 bits (which are then scrambled and spread to yield the 16,384 values in a 128×128 continuous tone watermark).

Some other 2D codes make use of error correction, but not to such a degree. A QR code, for example, encoded with the highest possible error correction level, can recover from only 30% loss of the code.

Preferred watermark embodiments are also characterized by a synchronization (reference) signal component that is expressed where message data is also expressed. For example, every mark in a sparse watermark is typically a function of the synchronization signal. Again in contrast, synchronization in QR codes is achieved by alignment patterns placed at three corners and at certain intermediate cells. Message data is expressed at none of these locations.

The methods, processes, and systems described above may be implemented in hardware, software or a combination of hardware and software. For example, the signal processing operations described above may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to detect signal attributes, perform pattern recognition and matching, encode and decode digital data signals, calculate relative attributes of source signals from different sources, etc.

The above methods, instructions, and hardware operate on reference and suspect signal components. As signals can be represented as a sum of signal components formed by projecting the signal onto basis functions, the above methods generally apply to a variety of signal types. The Fourier transform, for example, represents a signal as a sum of the signal's projections onto a set of basis functions.

The particular combinations of elements and features in the above-detailed embodiments are exemplary only; the interchanging and substitution of these teachings with other teachings in this and the incorporated-by-reference patents/applications are also contemplated.

What is claimed is:

1. A method comprising the acts:
   from a first content stream in a portable document format data structure, applying a filter to extract both first variable pattern data for a first watermark pattern and second variable pattern data for a second watermark pattern;

defining a first composite watermark pattern based on the first variable pattern data and a static watermark pattern data;

defining a second composite watermark pattern, different than the first composite watermark pattern, based on the second variable pattern data and said static watermark pattern data; and rendering both the first composite watermark pattern and the second composite watermark pattern on a common substrate, in which said rendering renders both the first composite watermark pattern and the second composite watermark pattern adjacent each other on the common substrate.

2. The method of claim 1 in which said filter is a run length decoding filter, a CCITT FAX decoding filter, or a JBIG2 decoding filter.

3. The method of claim 1 that further includes applying a filter to obtain said static watermark pattern data using a second content stream in said portable document format data structure.

4. The method of claim 3 that includes extracting a batch identifier from the second content stream, and accessing a data structure with said batch identifier to obtain said static watermark pattern data.

5. The method of claim 3 in which the first content stream and the second content stream comprise a single content stream.

6. The method of claim 1 that includes printing said watermark patterns adjacent each other on a tape substrate, for later use in sealing cartons.

7. In a method of compiling multiple 2D code patterns for labeling multiple respective items, each 2D code pattern comprising plural marks, each mark occupying a corresponding location in its respective 2D code pattern, each of said multiple 2D code patterns being different, each 2D code pattern expressing a payload signal component and a reference signal component, the reference signal component enabling a compliant decoder to determine scale and rotation of a 2D code pattern depicted within a camera-captured image of a labeled item, an improvement comprising the acts:

identifying a first set of locations that are consistently occupied by marks in said multiple 2D code patterns;

storing first data identifying said first set of locations in a first data structure;

for each of said multiple 2D code patterns, identifying a second set of locations occupied by marks, excluding locations included in the first set of locations; and for each of said multiple 2D code patterns, storing second data identifying said second set of locations in a second data structure;

wherein said second data structure expresses each mark location by a single datum rather than two or more data, said single datum being a single binary number, thereby effecting a reduction in storage medium capacity required for data structure storage.

8. The method of claim 7 in which said identifying act comprises identifying a first set of locations that are all occupied by marks in all of said multiple 2D code patterns.

9. The method of claim 7 that includes storing the first data identifying said first set of locations, and said second data identifying said second set of locations, in a shared data structure.

10. The method of claim 7 in which the first data structure and the second data structures share a common storage medium.

11. In a method of printing multiple 2D code patterns for labeling multiple respective items, each 2D code pattern comprising plural marks, each mark occupying a corresponding location in its respective 2D code pattern, each of said multiple 2D code patterns being different, each 2D code pattern expressing a payload signal component and a reference signal component, the reference signal component enabling a compliant decoder to determine scale and rotation of a 2D code pattern depicted within a camera-captured image of a labeled item, an improvement comprising the acts:

(a) reading first data from a first data structure, the first data indicating a first set of mark locations;

(b) reading second data from a second data structure, the second data indicating a second set of mark locations, the second data expressing each mark location by a single datum rather than two or more data, said single datum being a single binary number;

(c) printing a composite 2D code pattern having marks placed at mark locations indicated by the first data and the second data; and (d) repeating at least acts (b) and (c) multiple times, each with a different second set of mark locations, yielding different composite 2D code patterns.

12. The method of claim 11 in which the second data indicates a group of locations at which marks are to be added, and a group of locations at which marks are to be removed, the group of locations at which marks are to be removed being a subset of locations indicated by the first data.

13. The method of claim 12 in which the first data comprises data indicating a set of mark locations corresponding to the reference signal component, and additionally indicating a set of mark locations not corresponding to the reference signal component but instead corresponding to payload signal component mark locations for one or more of said 2D code patterns.

14. The method of claim 11 that includes reading the first data and the second data from a common data structure.

15. The method of claim 11 that includes printing plural of said composite 2D code patterns on a common substrate, for later separation and labeling of the multiple respective items.

\* \* \* \* \*